United States Patent
Oshimi

(10) Patent No.: US 7,585,471 B2
(45) Date of Patent: Sep. 8, 2009

(54) HONEYCOMB STRUCTURED BODY AND EXHAUST GAS PURIFYING DEVICE

(75) Inventor: Yukio Oshimi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 458 days.

(21) Appl. No.: 11/178,461

(22) Filed: Jul. 12, 2005

(65) Prior Publication Data

US 2006/0019061 A1    Jan. 26, 2006

Related U.S. Application Data

(63) Continuation of application No. PCT/JP2005/002171, filed on Feb. 14, 2005.

(30) Foreign Application Priority Data

Feb. 23, 2004    (JP)    ............... 2004-046949

(51) Int. Cl.
    *B01D 50/00*    (2006.01)
(52) U.S. Cl. ........................ 422/180; 422/177
(58) Field of Classification Search ............ 422/168, 422/177, 180, 211, 212
    See application file for complete search history.

(56) References Cited

U.S. PATENT DOCUMENTS

| | | | |
|---|---|---|---|
| 4,276,071 A | 6/1981 | Outland | |
| 4,364,761 A | 12/1982 | Berg et al. | |
| 4,416,676 A | 11/1983 | Montierth | |
| 4,417,908 A | 11/1983 | Pitcher, Jr. | |
| 4,420,316 A | 12/1983 | Frost et al. | |
| 5,194,414 A * | 3/1993 | Kuma | ............ 502/80 |
| 5,628,975 A | 5/1997 | Horiuchi et al. | |
| 5,914,187 A | 6/1999 | Naruse et al. | |
| 5,930,994 A | 8/1999 | Shimato et al. | |
| 5,997,984 A * | 12/1999 | Koike et al. | ............ 428/116 |
| 6,206,944 B1 | 3/2001 | Hickman | |
| 6,447,564 B1 | 9/2002 | Ohno et al. | |
| 6,565,630 B2 | 5/2003 | Ohno et al. | |
| 6,656,564 B2 * | 12/2003 | Ichikawa et al. | ............ 428/116 |
| 6,669,751 B1 | 12/2003 | Ohno et al. | |
| 6,696,132 B2 | 2/2004 | Beall et al. | |

(Continued)

FOREIGN PATENT DOCUMENTS

DE    100 37 403 A1    2/2002

(Continued)

OTHER PUBLICATIONS

U.S. Appl. No. 09/926,795.

(Continued)

*Primary Examiner*—Tom Duong
(74) *Attorney, Agent, or Firm*—Oblon, Spivak, McClelland, Maier & Neustadt, P.C.

(57) ABSTRACT

The honeycomb structured body of the present invention is a pillar-shaped honeycomb structured body having a honeycomb structure that a number of through holes are placed in parallel with one another in the length direction with a wall portion interposed therebetween and one of ends of each through hole is sealed, wherein a relation between a volume Y (L) of said honeycomb structured body and an aperture ratio X (%) on an inlet side satisfies the following inequality (1):

$$Y \leq -1.1X + 68.5 \text{ (wherein } Y \leq 19, 35 \leq X \leq 56) \quad (1).$$

33 Claims, 16 Drawing Sheets

U.S. PATENT DOCUMENTS

| | | |
|---|---|---|
| 6,770,116 B2 | 8/2004 | Kojima |
| 2003/0041730 A1 | 3/2003 | Beall et al. |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0076627 A1 | 4/2005 | Itou et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0059877 A1 | 3/2006 | Yoshida |
| 2006/0068159 A1 | 3/2006 | Komori et al. |
| 2006/0073970 A1 | 4/2006 | Yamada |
| 2006/0093784 A1 | 5/2006 | Komori et al. |
| 2007/0227109 A1 | 10/2007 | Hong et al. |
| 2008/0085394 A1 | 4/2008 | Ohno et al. |

FOREIGN PATENT DOCUMENTS

| | | |
|---|---|---|
| EP | 0 043 694 A1 | 1/1982 |
| EP | 1 489 274 A1 | 12/2004 |
| EP | 1 493 479 A1 | 1/2005 |
| EP | 1 502 639 A1 | 2/2005 |
| EP | 1 502 640 A1 | 2/2005 |
| EP | 1 541 817 A1 | 6/2005 |
| EP | 1 570 892 A1 | 9/2005 |
| FR | 2 789 327 | 8/2000 |
| FR | 2 840 545 | 12/2003 |
| GB | 2 064 360 A | 6/1981 |
| JP | 56-124417 | 9/1981 |
| JP | 56-124418 | 9/1981 |
| JP | 58-92409 | 6/1983 |
| JP | 58-150015 | 9/1983 |
| JP | 58-196820 | 11/1983 |
| JP | 62-96717 | 5/1987 |
| JP | 2-207845 | 8/1990 |
| JP | 3-38255 | 2/1991 |
| JP | 3-49608 | 7/1991 |
| JP | 5-68828 | 3/1993 |
| JP | 10-28871 | 2/1998 |
| JP | 2000-42420 | 2/2000 |
| JP | 3130587 | 11/2000 |
| JP | 2001-334114 | 12/2001 |
| JP | 2004-896 | 1/2004 |
| WO | WO 02/10562 A1 | 2/2002 |
| WO | WO 02/100514 A1 | 12/2002 |
| WO | WO 03/020407 A2 | 3/2003 |
| WO | WO 03/067041 A1 | 8/2003 |
| WO | WO 03/074848 | 9/2003 |
| WO | WO 03/080218 A1 | 10/2003 |
| WO | WO 2004/111398 A1 | 12/2004 |

OTHER PUBLICATIONS

U.S. Appl. No. 10/129,126.
U.S. Appl. No. 10/506,438, filed Mar. 22, 2005, Taoka et al.
U.S. Appl. No. 11/225,197.
U.S. Appl. No. 10/502,044, filed Jan. 24, 2005, Taoka et al.
U.S. Appl. No. 10/518,548, filed Jan. 3, 2005, Takahashi.
U.S. Appl. No. 10/521,592, filed Oct. 27, 2005, Ohno et al.
U.S. Appl. No. 10/527,531, filed Mar. 11, 2005, Ogyu et al.
U.S. Appl. No. 11/174,726, filed Jul. 6, 2005, Ohno et al.
U.S. Appl. No. 11/174,483, filed Jul. 6, 2005, Saijo et al.

* cited by examiner

A-A Line cross-sectional view

B-B Line cross-sectional view

HONEYCOMB STRUCTURED BODY AND EXHAUST GAS PURIFYING DEVICE

CROSS-REFERENCE TO RELATED APPLICATIONS

This application claims benefit of priority based on PCT/JP2005/002171 filed on Feb. 14, 2005. The contents of this application are incorporated herein by reference in their entirety.

BACKGROUND OF THE INVENTION

1. Field of the Invention

The present invention relates to a honeycomb structured body and an exhaust gas purifying device.

2. Discussion of the Background

In recent years, particulates, contained in exhaust gases discharged from internal combustion engines of vehicles such as buses, trucks, construction machines and the like, have raised serious problems as these particulates are harmful to the environment and the human body. There have been proposed various honeycomb structural bodies used as ceramics filters which allow exhaust gases to pass through porous ceramics to collect particulates in the exhaust gases, so that the exhaust gases can be purified.

Heretofore, there is disclosed a ceramic filter wherein through holes an end of each of them on a side from which exhaust gases flow out is sealed (hereinafter referred optionally to as "through hole on flow-in side") are made to be through holes of a large volume (hereinafter referred optionally to as "large-capacity through hole"), while through holes an end of each of them on a side to which exhaust gases flow in is sealed (hereinafter referred optionally to as "through hole on flow-out side") are made to be through holes of a small volume (hereinafter referred optionally to as "small-capacity through hole"), whereby an aperture ratio on the flow-in side of the exhaust gases is made relatively larger than that of the flow-out side of the exhaust gases.

FIG. 18 is a cross-sectional view showing schematically a cross-section perpendicular to the length direction of a conventional exhaust gas filter.

This exhaust-gas filter 60 has a cross-sectional structure in which squares, each smaller than each of square shapes constituting the checker board pattern, are placed on intersections of the checker board pattern, and this structure is constituted by small-capacity through holes 61b corresponding to the smaller squares and large-capacity through holes 61a located on the periphery thereof, with the partition wall 62a, 62b being formed between these through holes (see U.S. Pat. No. 4,417,908 and JP-A 58-196820).

FIGS. 19A to 19D are cross-sectional views each showing schematically a cross-section perpendicular to the length direction of another conventional exhaust filter.

These exhaust gas filters 300 to 330 are composed of large-capacity through holes 301a, 311a, 321a, and 331a having various shapes, respectively, and small-capacity through holes 301b, 311b, 321b, and 331b having various shapes, respectively. Portions of the partition wall 302, 312, 322, and 332 are formed between these through holes, respectively.

Any of the portions of the partition wall 302, 312, 322, and 332 is the one for separating each of the large-capacity through holes 301a, 311a, 321a, and 331a and each of the small-capacity through holes 301b, 311b, 321b, 331b, respectively. In this respect, it may be said that no partition wall for separating the large-capacity through holes 301a, 311a, 321a, and 331a from one another exists (see U.S. Pat. No. 4,364,761, JP-A 56-124417, JP-A 62-96717, U.S. Pat. No. 4,276,071 and JP-A 56-124418).

Furthermore, a filter wherein a cell pitch of large-capacity through holes is made to be almost 1.0 to 2.5 mm is disclosed as another prior art (see J UM-A 56-187890 microfilm (J UM-A 58-92409 (see page 4, FIG. 6))).

Besides, a filter wherein a volume ratio in large-capacity through holes is 60 to 70%, a volume ratio in small-capacity through holes is 20 to 30%, and a cell pitch of the large-capacity through holes is almost 2.5 to 5.0 mm is also disclosed (see JP-A 5-68828 (Japanese Patent No. 3130587 (page 1))).

FIG. 20 is a cross-sectional view showing schematically a cross-section perpendicular to the length direction (hereinafter optionally referred simply to as "cross-section") of each of the above-mentioned filters 200. In the filter 200, small-capacity through holes 202 each having a triangular cross-section are disposed around each large-capacity through hole 201 having a hexagonal cross-section.

Moreover, a filter having 40 to 120% of a percentage of a ratio of a gross area in cross-sections of small-capacity through holes with respect to a gross area in cross-sections of large-capacity through holes is also disclosed (see JP-A 2001-334114 (see page 5, FIG. 2) and International Publication No. WO02/100514).

FIG. 21 is across-sectional view that schematically shows a cross-section perpendicular to the length direction of such a honeycomb structured body, and in a filter 210, small-capacity through holes 212, each having an laterally elongated hexagonal shape in its cross section, are placed on the periphery of a large-capacity through hole 211 having a right hexagonal shape in its cross section. Moreover, in the periphery of the circumference thereof, the large-capacity through holes 211 having a right hexagonal shape and large-capacity through holes 213 having a trapezoidal shape are placed also in parallel with each other.

Moreover, a filter wherein the number of through holes on its flow-in side is made larger than that of its flow-out side, whereby an aperture ratio on the flow-in side of exhaust gases is made to be relatively larger than that of the flow-out side of the exhaust gases is also disclosed (For example, see FIG. 3 of JP-A 2001-334114).

On one hand, a technique for adjusting a thickness of a wall, and physical properties of a filter are also disclosed (see U.S. Pat. Nos. 4,416,676 and 4,420,316). A filter containing through holes having square and rectangular cross-sections is also disclosed (see JP-A 58-150015).

A filter containing through holes having two types of shapes, among others, octagonal and quadrangular shapes is also disclosed (see French Patent No. 2789327 and International Publication No. WO02/10562). Another filter containing through holes having two types of shapes, i.e. relatively large square and small square shapes is disclosed (see International Publication No. WO03/20407).

In addition, a honeycomb filter having 1.1 to 15 times higher aperture ratio on a flow-in side of exhaust gases than that of a flow-out side of the exhaust gases is also disclosed (see International Publication No. WO03/80218).

The contents of U.S. Pat. No. 4,417,908, JP-A 58-196820, U.S. Pat. No. 4,364,761, JP-A 56-124417, JP-A 62-96717, U.S. Pat. No. 4,276,071, JP-A 56-124418, JUM-A56-187890microfilm, Japanese Patent No. 3130587, JP-A 2001-334114, International Publication No. WO02/100514, U.S. Pat. Nos. 4,416,676, 4,420,316, JP-A 58-150015, French Patent No. 2789327, International Publication No. WO02/

10562, and International Publication No. WO03/80218 are incorporated herein by reference in their entirety.

SUMMARY OF THE INVENTION

A honeycomb structured body according to the present invention is a pillar-shaped honeycomb structured body having a honeycomb structure that a number of through holes are placed in parallel with one another in the length direction with a wall portion interposed therebetween and one of ends of each through hole is sealed, wherein a relation between a volume Y (L) of the honeycomb structured body and an aperture ratio X (%) on an inlet side satisfies the following inequality (1):

$$Y \leq -1.1X + 68.5 \text{ (wherein } Y \leq 19, 35 \leq X \leq 56) \quad (1).$$

In the honeycomb structured body according to the present invention, desirably, the relation between the volume Y (L) of the honeycomb structured body and the aperture ratio X (%) on the inlet side satisfies the following inequality (2):

$$Y \leq -1.1X + 66.3 \text{ (wherein } 2.5 \leq Y \leq 19, 35 \leq X \leq 56) \quad (2)$$

Desirably, upon using the honeycomb structured body as a honeycomb structured body for purifying exhaust gases of an internal combustion engine, a relation among the volume Y (L) of the honeycomb structured body, the aperture ratio X (%) on the inlet side and a discharge amount V (L) of the internal combustion engine satisfies the following inequality (3):

$$100V - 400 \leq X \cdot Y \leq 100V + 100 \quad (3).$$

In the honeycomb structured body, desirably, the number of the through holes comprise large-capacity through holes opened on a flow-in side of exhaust gases and each having a relatively large area in a cross-section perpendicular to the length direction thereof, and small-capacity through holes opened on a flow-out side of the exhaust gases and each having a relatively small area in the cross-section. Desirably, the number of the large-capacity through holes is substantially the same as that of the small-capacity through holes.

In the honeycomb structured body, desirably, shapes of a number of through holes in their cross-sections perpendicular to the length direction include at least two or more types of shapes.

Desirably, shapes in cross-sections perpendicular to the length direction of the large-capacity through holes and/or the small-capacity through holes are polygonal, e.g., octagonal; and quadrangular shape.

In the honeycomb structured body, it is desirable that a ratio of cross-sectional areas of the large-capacity through holes with respect to cross-sectional areas of the small-capacity through holes is at least about 1.55 and at most about 2.75, the range of about 2.0 to about 2.54 is more desirable, and the range of about 2.0 to about 2.42 is even more desirable.

Desirably, peripheries of corners in cross-sections perpendicular to the length direction of the large-capacity through holes and/or the small-capacity through holes are defined by a curved line.

In the honeycomb structured body, desirably, a distance between centers of gravity in the cross-sections perpendicular to the length direction of the adjacently located large-capacity through holes is equal to a distance between centers of gravity of the cross-sections perpendicular to the length direction of the adjacently located small-capacity through holes.

In the honeycomb structured body, desirably, a catalyst is supported by a surface and/or an inside of the partition wall separating the number of through holes from one another.

In the honeycomb structured body, a plurality of pillar-shaped porous members each comprising a plurality of through holes placed in parallel with one another in the length direction with a partition wall interposed therebetween may be bound to one another through a sealing material layer.

In the honeycomb structured body, when the porous member is made of ceramics, it is desirable that the porosity is at least about 20% and at most about 80% by volume, and when the porous member is made of a metal, it is desirable that the porosity is at least about 50% and at most about 98% by volume. Furthermore, it is desirable that the above-mentioned porous member has an average pore diameter of at least about 1 μm and at most about 100 μm.

The honeycomb structured body may be constituted by a pillar-shaped porous member having a number of through holes placed in parallel with one another in the length direction with a partition wall interposed therebetween.

In the honeycomb structured body, when the porous member is made of ceramics, it is desirable that the porosity is at least about 20% and at most about 80% by volume, and when the porous member is made of a metal, it is desirable that the porosity is at least about 50% and at most about 98% by volume. Furthermore, it is desirable that the above-mentioned porous member has an average pore diameter of at least about 1 μm and at most about 100 μm.

Desirably, a shape of the honeycomb structured body is cylindrical.

In the honeycomb structured body, convex portions and/or concave portions are formed inside the number of through holes in parallel with the length direction thereof, and the convex portions and/or concave portions are formed on the portions of the partition wall, which is shared in common by inlet side-through holes.

Desirably, the convex portions and/or concave portions function as at least one of a region for supporting selective catalysts, a particulate collecting site, and a site for improving heat stress-resistance of the honeycomb structured body.

In the honeycomb structured body, an isostatic strength is desirably about 7 MPa or more, and more desirably about 9 MPa or more. A compression strength along an A-axis is desirably about 18 MPa or more, and more desirably about 25 MPa or more.

Desirably, a shape in a cross-section perpendicular to the length direction of the number of through holes: is constituted by a single shape; and composed of at least two types of cross-sectional areas.

In the honeycomb structured body, desirably, a main component is at least one kind selected from SiC, $Si_3N_4$, aluminum titanate, cordierite, mullite, alumina, spinel, lithium aluminum silicate, Fe.Cr.Al-base metals, and metallic silicon.

Furthermore, the honeycomb structured body is desirably used for an exhaust gas purifying device of a vehicle.

DESCRIPTION OF THE EMBODIMENTS

A honeycomb structured body according to the present invention is a pillar-shaped honeycomb structured body having a honeycomb structure that a number of through holes are placed in parallel with one another in the length direction with a wall portion interposed therebetween and one of ends of each through hole is sealed, wherein a relation between a volume Y (L) of the honeycomb structured body and an aperture ratio X (%) on an inlet side satisfies the following inequality (1):

$$Y \leq -1.1X + 68.5 \text{ (wherein } Y \leq 19, 35 \leq X \leq 56\text{)} \quad (1).$$

Herein, the aperture ratio X (%) on the inlet side means a percentage of a sum total of areas in inlet side-through holes with respect to an area of the whole end of the honeycomb structured body on the inlet side.

The honeycomb structured body according to the present invention is a pillar-shaped honeycomb structured body having a honeycomb structure that a number of through holes are placed in parallel with one another in the length direction with a wall portion interposed therebetween and one of ends of each through hole is sealed.

The above-mentioned honeycomb structured body may be modified in such that a plurality of pillar-shaped porous members each comprising a plurality of through holes placed in parallel with one another in the length direction with a partition wall interposed therebetween are bound to one another through a sealing material layer (hereinafter referred optionally to as "aggregation type honeycomb structured body"), or such that whole the porous members are sintered so as to have an integral structure (hereinafter referred optionally to as "integral type honeycomb structured body"). In addition, the lamination members may be laminated in the length direction so as to superpose through holes one another in the honeycomb structured body.

Figure 1:
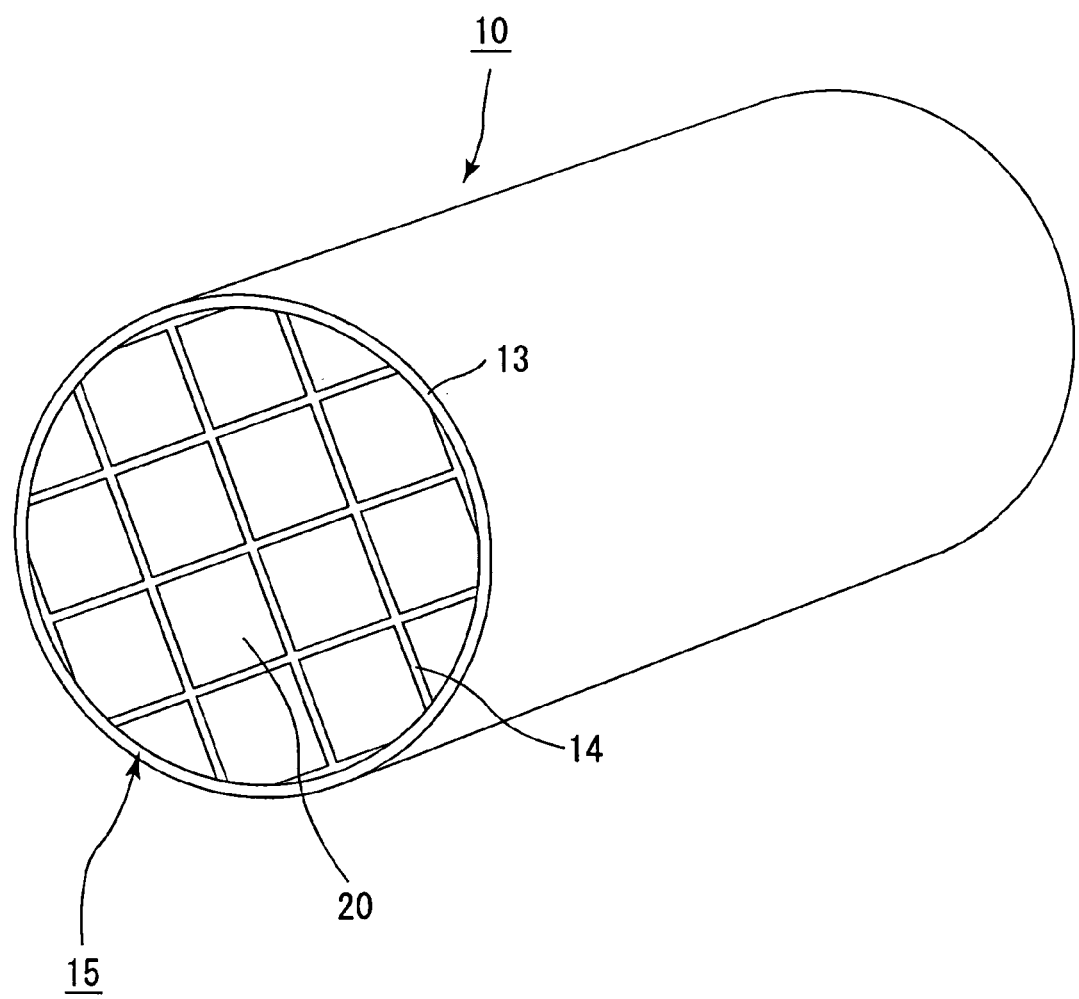
FIG. 1 is a perspective view showing schematically an example of a honeycomb structured body according to the present invention.
Figure 2A:
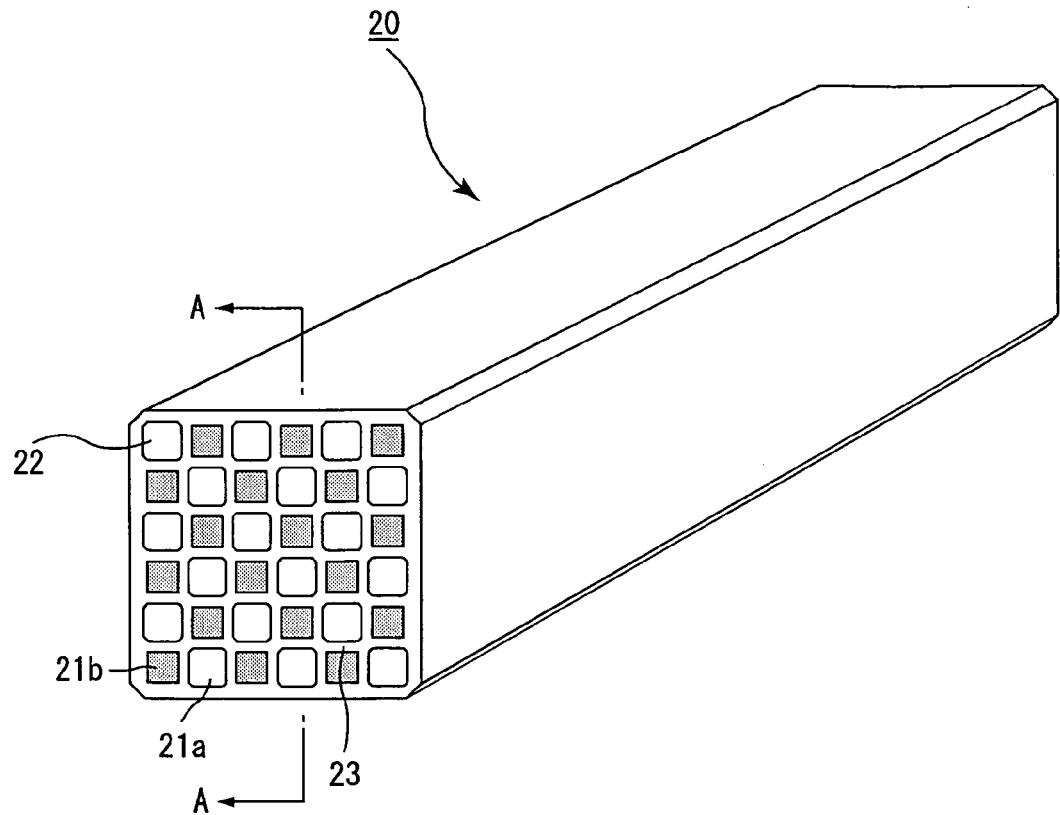
FIG. 2A is a perspective view showing schematically an example of a porous member constituting a honeycomb structured body shown in FIGS. 3A and 3B.
Figure 2B:
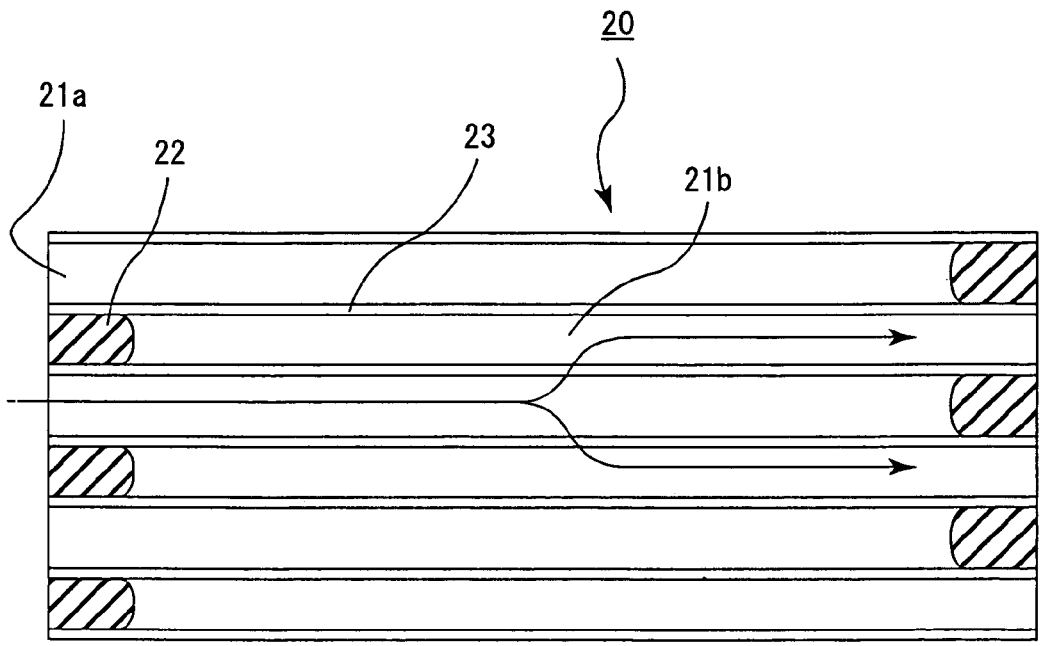
FIG. 2B is a cross-sectional view taken along the line A-A of the porous member shown in FIG. 2A.

FIG. 1 is a perspective view showing schematically an illustrative embodiment of aggregative type honeycomb structured body being an example of the honeycomb structured body according to the present invention. FIG. 2A is a perspective view showing schematically an example of a porous member a certain number of which constitutes the honeycomb structured body shown in FIG. 1, and FIG. 2B is a cross-sectional view taken along the line A-A of the porous member shown in FIG. 2A.

As shown in FIG. 1, in a honeycomb structured body 10 according to the present invention, a plurality of porous members 20 is bound to one another through a sealing material layer 14 to constitute a porous block 15, and a sealing material layer 13 for preventing exhaust gas leakage is formed around the a porous block 15.

In the porous member 20, a number of through holes 21 are placed in parallel with one another in the length direction wherein a through hole 21 comprises two types of through holes, i.e. one of which is a large-capacity through hole 21a having a relatively large area of a cross-section perpendicular to the length direction, and the other is a small-capacity through hole 21b having a relatively small area of a cross-section perpendicular to the longitudinal section. The large-capacity through hole 21a is sealed with a plug 22 at the end on an outlet side of exhaust gases in the honeycomb structured body 10, while the small-capacity through hole 21b is sealed with the plug 22 at the end on an inlet side of the exhaust gases in the honeycomb structured body 10 wherein a partition wall 23 for separating these two types of through holes from one another functions as a honeycomb structured body. More specifically, exhaust gases flowing into the large-capacity through holes 21a pass inevitably through the partition wall 23 to flow out from the small-capacity through holes 21b.

The honeycomb structured body 10 as described above has a relation between its volume Y (L) and an aperture ratio X (%) on the inlet side of the large-capacity through holes 21a which satisfies the following inequality (1):

$$Y \leq -1.1X + 68.5 \text{ (wherein } Y \leq 19, 35 \leq X \leq 56) \tag{1}$$

In general, when a honeycomb structured body is utilized by disposing it in a flow path of exhaust gases, ash starts to be accumulated from a rear (outlet side) of the honeycomb structured body. Because of such phenomenon, it is required to increase a volume in a through hole which is opened on an inlet side for suppressing a pressure loss, in other words, for prolong a life of the honeycomb structured body, even if the ash is accumulated for a long period of time. In this respect, in order to increase the volume in a through hole which is opened on the inlet side, it is required that: an aperture ratio on the inlet side is made to be high; and a volume of the honeycomb structured body is increased.

However, when the aperture ratio becomes high, a density of the whole honeycomb structured body decreases. As a result, a regeneration limit value (the maximum accumulation amount of particulates at which any crack does not appear when particulates accumulated are burned off.) becomes low, so that a period of time up to a required regeneration becomes short.

On one hand, when a volume of the honeycomb structured body increases, a thermal capacity of the whole honeycomb structured body increases, resulting in poor temperature rising property of the whole honeycomb structured body.

On the other hand, firstly, a volume of the above-mentioned honeycomb structured body satisfying a relation represented by the above inequality (1) according to the present invention is limited to 19 (L) or less. Thus, by setting the upper limit of the volume of the honeycomb structured body as described above, deterioration in temperature rising property of the whole honeycomb structured body can be prevented.

Furthermore, it is desirable that an aperture ratio on an inlet side of a honeycomb structured body is at least about 35% and at most about 65%. When the aperture ratio on the inlet side is at least about 35% and at most about 65%, the weight of porous members constituting the honeycomb structured body is prevented from becoming too heavy, whereby a thermal capacity does not increase, leading to good temperature rising property. Moreover, since each amount (volume) of wall portion does not increase, the pressure loss does not increase easily. In addition, the density of the whole honeycomb structured body does not decrease, and decrease in the regeneration limit value does not occur.

Moreover, ranges of an aperture ratio on the inlet side and a volume of a honeycomb structured body are set up so as to have a relation:

$$Y \leq -1.1X + 68.5 \tag{1}$$

within the above-mentioned aperture ratio and volume in the honeycomb structured body. This is because a regeneration limit value decreases, so that a period of time up to a required regeneration reduces after all, or its strength decreases, resulting in deterioration of mechanical properties required in case of installing a honeycomb structured body into exhaust gas piping and the like in the honeycomb structured body which does not satisfy the above-mentioned inequality (1), even if it is within a range of the above-mentioned aperture ratio and volume of the honeycomb structured body.

In a honeycomb structured body according to the present invention, since a relation between an aperture ratio on an inlet side and a volume of the honeycomb structured body is established so as to satisfy the above-mentioned inequality (1), a volume of through holes opened on their inlet sides can be increased, whereby increase in a pressure loss is suppressed, so that a large amount of particulates and ash can be accumulated. In addition, decrease in a density of the whole honeycomb structured body can be suppressed, whereby decrease in a regeneration limit value can be prevented, so that the resulting honeycomb structured body is excellent in thermal responsiveness, and it results in having a long life time.

In the honeycomb structured body according to the present invention, desirably, the relation between the volume Y (L) and the aperture ratio X (%) on the inlet side of the above-mentioned honeycomb structured body satisfies the following inequality (2):

$$Y \leq -1.1X + 66.3 \text{ (wherein } 2.5 \leq Y \leq 19, 35 \leq X \leq 56) \tag{2}$$

In a honeycomb structured body satisfying a relation represented by the above-mentioned inequality (2), a volume of the honeycomb structured body is set out at a value of about 2.5 L or more. When the volume is about 2.5 L or more, the volume of the honeycomb structured body becomes large. In this case, even if an aperture ratio or the like on an inlet side is increased so as to increase a total accumulation amount of particulates, it will be hard for cracks and the like to appear.

Furthermore, even when the above-mentioned aperture ratio and the volume of a honeycomb structured body is in the above specified range, if the above-mentioned inequality (2) is not satisfied, it cannot be said that its regeneration limit value is sufficient.

According to a honeycomb structured body of the present invention, when a relation between an aperture ratio on the inlet side and a volume of the honeycomb structured body is set out so as to satisfy the above-mentioned inequality (2), increase in a pressure loss can be suppressed, whereby a much more amount of particulates and ash can be accumulated, besides decrease in a density of the whole honeycomb structured body can be suppressed, whereby decrease in a regeneration limit value can be more effectively prevented, resulting in excellent thermal responsiveness, and a long life time can be achieved.

Moreover, in the case where the honeycomb structured body according to the present invention is used as a honeycomb structured body for purifying exhaust gases of an internal combustion engine, it is desired that a relation among a volume Y (L) of the honeycomb structured body, an aperture ratio X (%) on the inlet side thereof, and a discharge amount V (L) satisfies also the following inequality (3):

$$100V - 400 \leq X \cdot Y \leq 100V + 100 \quad (3)$$

When the above-mentioned honeycomb structured body is used as a filter for purifying exhaust gases of an internal combustion engine, a gas flow rate increases with increase in a discharge amount of the internal combustion engine. As a consequence, a resistance pressure of the honeycomb structured body increases.

In these circumstances, in order to decrease a pressure loss (exhaust pressure), it is sufficient to increase a volume of the honeycomb structured body. As mentioned above, however, when a volume of the honeycomb structured body increases, a thermal capacity of the whole honeycomb structured body increases, so that its thermal responsiveness decreases. In addition, in the case when a catalyst is supported on the honeycomb structured body, reactivity of the catalyst with exhaust gases becomes worse dependent upon a flow rate of the exhaust gases flowing into the honeycomb structured body.

In this respect, the honeycomb structured body having the relation represented by the above inequality (3) of the present invention has a suitable volume and a suitable aperture ratio on the inlet side with respect to a discharge amount of an internal combustion engine. Thus, the present invention can provide the optimum honeycomb structured body in response to a variety of internal combustion engines.

Although a porosity in a porous member is not specifically limited, it is desirable that the porosity is at least about 20% and at most about 80% in the case where the porous member is composed of ceramics as mentioned below. When a porosity is at least about 20% and at most about 80%, the honeycomb structured body cannot easily be clogged, nor can it be easily broken from the decrease in strength of a porous member.

Moreover, in the case when the above-mentioned porous member is made of a metal as mentioned hereinafter, a desirable range of the porosity is at least about 50% and at most about 98% by volume. When the porosity is at least about 50% and at most about 98% by volume, a deep-layer filtration can be achieved inside a wall portion, and temperature rise characteristic becomes better. Furthermore, a porous member cannot easily be destroyed from its decrease in strength. A more desirable range is in the range of about 70% to about 95% by volume.

Furthermore, it is desirable that the above-mentioned porous member has an average pore diameter of at least about 1 μm and at most about 100 μm. When the average pore diameter is at least about 1 μm and at most about 100 μm, the porous member cannot be easily clogged by particulates. Moreover, particulates will not pass through pores, but be collected surely, and thus, such porous member can function as a filter.

It is to be noted that a porosity or an average pore diameter may be measured by a heretofore well-known measuring method such as mercury porosimetry, gravimetric method, Archimedes method, and scanning electron microscope (SEM).

Although a particle diameter of a powder used in the case where such porous member as mentioned above is manufactured is not specifically limited, but desirable is a powder which exhibits less shrinkage in the following firing step. For instance, a mixture comprising 100 parts by weight of a powder having an average particle diameter of at least about 0.3 μm and at most about 50 μm and at least about 5 parts and at most about 65 parts by weight of a powder having an average particle diameter of at least about 0.1 μm and at most about 1.0 μm is desirable. This is because when powders each having the above-mentioned particle diameter are admixed with each other in the above-mentioned mix proportion, a porous member having the above-mentioned necessary properties can be manufactured.

As the above-mentioned plug, desirable is that it is made from a porous material.

In a honeycomb structured body according to the present invention, since a porous member wherein the above-mentioned plug is used is made from a porous material, when the plug and the porous member are made from the same porous material, an adhesive strength of them can be improved. Besides, when a porosity of the plug is adjusted as in the case of the above-mentioned porous member, a thermal expansion coefficient of the above-mentioned porous member can be matched with that of the plug, whereby an appearance of a gap between a plug and a partition wall, or an appearance of cracks on a partition wall being in contact with a plug or an area which is in contact with a plug due to thermal stress in case of manufacturing or applying a honeycomb structured body can be prevented.

When the plug is made from a porous material, its material is not specifically limited, but, for example, the same materials as those from which the above-mentioned porous member is prepared may be listed.

In a honeycomb structured body according to the present invention, a sealing material layer 13 and a sealing material layer 14 are formed on the outer circumference of a porous block 15, and disposed between porous members 20. The sealing material layer 14 thus disposed between the porous members 20 and 20 is also served for an adhesive for binding a plurality of porous members 20 with each other. On one hand, the sealing material layer (coat layer) 13 formed on the outer circumference of the porous block 15 is served for a sealing material for preventing leakage of exhaust gases from the outer circumference of the porous block 15 in the case where a honeycomb structured body 10 according to the present invention is located on an exhaust passage of an internal combustion engine.

A material constituting the above-mentioned sealing material layer is not specifically limited, but, for example, inorganic binders, organic binders, inorganic fibers and/or inorganic particles may be listed.

As mentioned above, a sealing material layer is disposed between porous members, or a sealing material layer is formed on the outer circumference of a porous block in a honeycomb structured body of the present invention. In this respect, these sealing material layers may be the same or different from one another. Furthermore, when these sealing material layers are made from the same material, a mix proportion of the material may be the same or different from one another.

An example of the inorganic binders includes silica sol, alumina sol and the like. They may be used alone, or may be used two or more of them together. Among the inorganic binders, silica sol is desirable.

An example of the organic binders includes polyvinyl alcohol, methyl cellulose, ethyl cellulose, and carboxymethylcellulose. They may be used alone, or may be used two or more of them together. Among the organic binders, carboxymethylcellulose is desirable.

An example of the inorganic fibers includes ceramic fibers of silica-alumina, mullite, alumina, and silica. They may be used singly, or in a combination of two or more of them. Among the inorganic fibers, alumina fibers and silica-alumina fibers are desirable.

It is desirable that a fiber length of the above-mentioned inorganic fibers is at least about 5 μm and at most about 100 mm, and the range of about 5 μm to about 100 μm is more desirable. When a fiber length is at least about 5 μm and at most about 100 mm, elasticity of a sealing material layer does not become insufficient. Further, dispersion of the inorganic fibers in the resulting product improves since it is difficult for the inorganic fibers to take a pilled-like formation. In addition, when the fiber length is in the range of about 5 μm to about 100 μm, it becomes easier to reduce a thickness of a sealing material layer.

An example of the above-mentioned inorganic particles includes carbides, and nitrides. A specific example of them includes an inorganic powder or a whisker prepared from silicon carbide, silicon nitride, and boron nitride. They may be used singly, or in a combination of two or more of them. Among the inorganic particles, silicon carbide being excellent in thermal conductivity is desirable.

The sealing material layer 14 may be made of either a dense material, or a porous material in such that exhaust gases may pass therethrough. However, the sealing material layer 13 is desirably made from a dense material. This is because the sealing material layer 13 is formed for the sake of preventing leakage of exhaust gases from the outer circumference of the porous block 15 in the case when the honeycomb structured body 10 of the present invention is installed into an exhaust gas passage of an internal combustion engine.

Figure 3A:
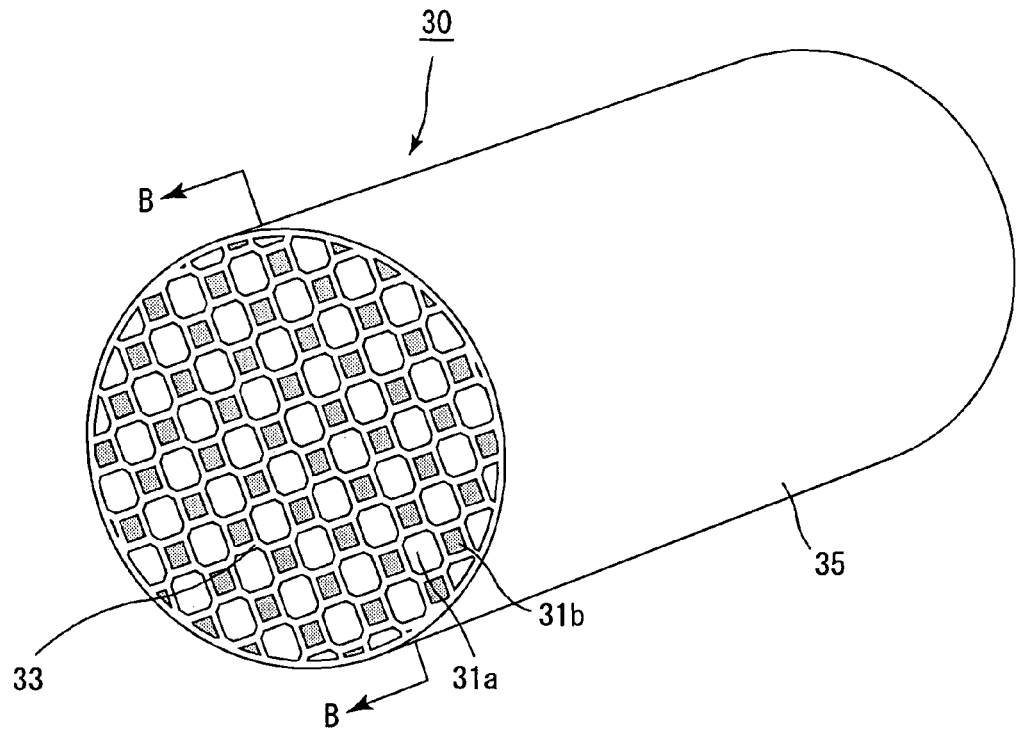
FIG. 3A is a perspective view showing schematically another example of a honeycomb structured body according to the present invention.
Figure 3B:
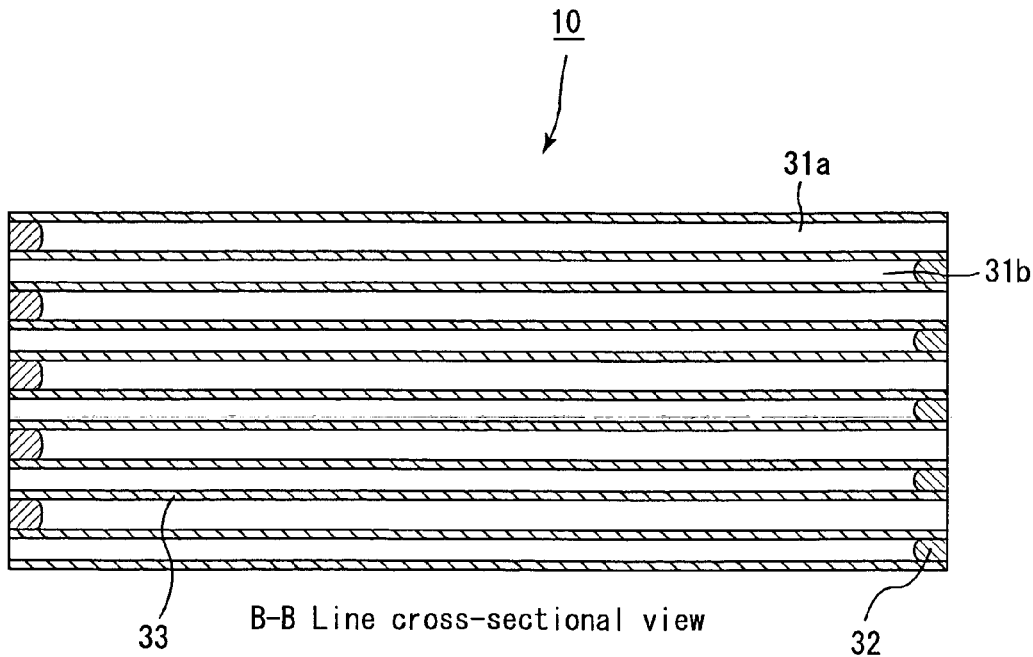
FIG. 3B is a cross-sectional view taken along the line B-B of the honeycomb structured body shown in FIG. 3A.

FIG. 3A is a perspective view showing schematically a specific example of an integral type honeycomb structured body being an example of the honeycomb structured body according to the present invention, and FIG. 3B is a cross-sectional view taken along the line B-B of FIG. 3A.

As shown in FIG. 3A, a honeycomb structured body 30 is composed of a cylindrical porous block 35 wherein a number of through holes 31 are placed in parallel with one another along the length direction thereof through the wall portion 33. The through holes 31 include two types of through holes, i.e. one of which is a large-capacity through hole 31a having a relatively large area of a cross-section perpendicular to the length direction, and the other is a small-capacity through hole 31b having a relatively small area of a cross-section perpendicular to the longitudinal section. The large-capacity through hole 31a is sealed with a plug 32 at the end on an outlet side of exhaust gases in the honeycomb structured body 30, while the small-capacity through hole 31b is sealed with the plug 32 at the end on an inlet side of the exhaust gases in the honeycomb structured body 30 wherein a wall portion 33 for separating these two types of through holes from one another functions as a honeycomb structured body.

Although it is not shown in FIGS. 3A and 3B, a sealing material layer may be formed around the porous block 35 as in the case of the honeycomb structured body 10 shown in FIG. 1.

The honeycomb structured body 30 is configured in the same manner as that of the aggregation type honeycomb structured body 10 except that the porous blocks 35 are sintered to manufacture a honeycomb structured body having an integral structure. Exhaust gases flowing into the large-capacity through hole 31a pass through the wall portion 33 separating through holes 31 from one another, and then, it flows out from the small-capacity through hole 31b. Accordingly, the same effects as in the case of the aggregation type honeycomb structured body can be obtained in also the integral type honeycomb structured body 30.

Furthermore, in also the integral type honeycomb structured body 30, its shape and size may be arbitrary as in the case of the aggregation type honeycomb structured body 10. Moreover, its porosity is desirably at least about 20% and at most about 80%, and its pore diameter is desirably at least 1 μm and at most about 100 μm as in the case of the aggregation type honeycomb structured body 10.

A porous material constituting the porous block 35 is not specifically limited, but an example of which includes nitrides, carbides, and oxide ceramics as in the case of the aggregation type honeycomb structured body. However, oxide ceramics such as cordierite is usually used. The reason therefor is in that a honeycomb structured body can be inexpensively manufactured; besides such oxide ceramics has a comparatively small coefficient of thermal expansion, so that there is scarcely a fear of damaging the resulting honeycomb structured body in the course of manufacturing and application thereof.

The plug 32 in such integral honeycomb structured body 30 is desirably a porous member as in the case of an aggregation type honeycomb structured body wherein a material therefor is not specifically limited, but an example of which includes the same materials as that constituting the porous member 35 as mentioned above.

Moreover, a honeycomb structured body according to the present invention maybe formed by laminating porous lamination members along the length direction thereof so as to superpose through holes one another.

Specifically, the honeycomb structured body may be the one formed by laminating porous lamination members wherein a plurality of through holes are formed at predetermined positions, each of the through holes having a thickness of at least about 0.1 mm and at most about 20 mm, and the lamination members being laminated so as to superpose one another in the length direction thereof. The expression "the lamination members are laminated so as to superpose one another" means that each of the through holes formed with adjacent lamination members is laminated with each other so as to communicate therewith.

The honeycomb structural bodies of the present invention as shown in FIGS. 1, 3A and 3B, each of them composed of two types of a number of through holes, i.e. large-capacity through holes opened on a side to which exhaust gases flow in and small-capacity through holes on a side from which the exhaust gases flow out wherein both the numbers of through holes of these two types are almost equal to each other.

The expression "a honeycomb structured body is composed of two types of through holes, i.e. large-capacity through holes and small-capacity through holes wherein both the numbers of through holes of these two types are almost equal to each other" means that when viewed from a cross-section perpendicular to the length direction, both the numbers are equal to each other based on a certain pattern composed of the large-capacity through holes and the small-capacity through holes, although there is such a case that both the numbers of the large-capacity through holes and the small-capacity through holes are not equal to each other due to a contour shape and the like.

A honeycomb structured body according to the present invention is not necessarily composed of two types of a number of through holes, i.e. large-capacity through holes opened on a side to which exhaust gases flow in and small-capacity through holes on a side from which the exhaust gases flow out, but a number of the above-mentioned through holes may have other configurations so far as an aperture ratio X (%) on an inlet side satisfies a relation represented by the above-mentioned inequality (1). In addition, it is not necessarily required that both the numbers of a large number of through holes are equal to each other.

However, it is preferable that a honeycomb structured body of the present invention is composed of large-capacity through holes each having a relatively large area of a cross-section perpendicular to the length direction, and small-capacity through holes each having a relatively small area of a cross-section perpendicular to the longitudinal section.

This is because, when the above-mentioned honeycomb structured body is compared with: a honeycomb structured body composed of through holes each having the same volume; or the honeycomb structured body composed of large-capacity through holes each having a relatively large area of a cross-section perpendicular to the length direction on a flow-out side of exhaust gases and small-capacity through holes each having a relatively small area of a cross-section perpendicular to the length direction on a flow-in side of exhaust gases, the former honeycomb structured body makes it possible to increase a critical amount for collecting particulates, resulting in a prolongation of a period of time up to a required of regeneration and an achievement of a long life time, due to an relatively increased aperture ratio on a flow-in side of exhaust gases in the former honeycomb structured body.

Moreover, it is desirable that both the numbers of large-capacity through holes and small-capacity through holes are almost equal to each other. Exhaust gases enter into a through hole opened on a flow-in side of the exhaust gases, then the gases pass through a porous area functioning as a partition wall, and the exhaust gases go out from a through hole opened on a flow-out side of the exhaust gases. Accordingly, when both the numbers of large-capacity through holes and small-capacity through holes are almost equal to each other, such a ratio of the large-capacity through holes existing adjacent to the small-capacity through holes increases, so that the partition wall can be efficiently used.

A honeycomb structured body according to the present invention is desirably configured such that a plurality of cylindrical porous members as shown in FIG. 1, each of which is prepared by juxtaposing a plurality of through holes along the length direction through the partition wall, are bound together through a sealing material layer.

This is because, according to an arrangement, a size and a shape of a honeycomb structured body can be easily changed in accordance with the number of combination of porous members, besides the sealing material layer functions as a shock absorbing material, so that excellent durability is obtained against thermal shock and the like.

In a honeycomb structured body according to the present invention, a shape in cross-sections perpendicular to the length direction of the number of through holes is constituted by a single shape, and desirably composed of at least two shapes in their cross-sections. According to the latter modification, there are many cases where a mechanical strength of the resulting honeycomb structured body is improved, resulting in excellent durability.

Although a shape of the honeycomb structured body 10 is a cylindrical shape, the invention is not limited to the cylindrical, but any arbitrary shape such as elliptical, and rectangular pillar-shape is applicable, besides any size of them may be used.

It is desired that a shape of a cross-section perpendicular to the length direction in large-capacity through holes and/or small-capacity through holes is a polygon.

When the shape in the cross-section is a polygon, a honeycomb structured body being excellent in durability and having a long life time can be realized, even if an area of a partition wall in the cross-section perpendicular to the length direction is decreased to increase an aperture ratio for the sake of decreasing a pressure loss.

Among polygons, such polygons which are quadrangle and higher polygons are desirable, and it is more desirable that at least one angle of the polygons is a blunt angle.

Specifically, a combination of octagonal shapes and quadrangular shapes is more desirable. In this case, a honeycomb structured body being more excellent in durability and having a longer life can be realized. As described above, it is desirable that a shape of a cross-section perpendicular to the length direction in a number of through holes is at least two or more types of shapes.

In a honeycomb structured body according to the present invention, it is desired that peripheries of corners in cross-sections of large-capacity through holes and/or small-capacity through holes are defined by a curved line in the case where a number of through holes is composed of the large-capacity through holes and the small-capacity through holes.

When the peripheries are defined by the curved line, a pressure loss due to a friction which appears in the case when exhaust gases pass through an inlet side of a through hole and a friction which appears in the case when the exhaust gases pass through an outlet side of a through hole can be further decreased.

Moreover, an appearance of cracks due to a concentration of a stress in such corner portions can also be prevented.

In the above-mentioned honeycomb structured body, it is desired that when a number of through holes is composed of large-capacity through holes and small-capacity through holes, a distance between centers of gravity in the cross-sections of the adjacently located large-capacity through holes is equal to a distance between centers of gravity of the cross-sections of the adjacently located small-capacity through holes.

It may be considered that when the two distances between centers of gravity are equal to each other, heat diffuses homogeneously in case of regeneration of a honeycomb structured body, whereby a local dispersion of temperature disappears in the honeycomb structured body. Hence, such honeycomb structured body being excellent in durability, i.e. where no cracks and the like appear due to a thermal stress is obtained, even if it is repeatedly used for a long period of time.

In the present invention, the expression "a distance between centers of gravity in the cross-sections of the adjacently located large-capacity through holes" means that the minimum distance between a center of gravity in a cross-section perpendicular to the length direction of a large-capacity through hole and a center of gravity in a cross-section perpendicular to the length direction of the adjacent large-capacity through hole. On one hand, the expression "a distance between centers of gravity in the cross-sections of the adjacently located small-capacity through holes" means that the minimum distance between a center of gravity in a cross-section perpendicular to the length direction of a small-capacity through hole and a center of gravity in a cross-section perpendicular to the length direction of the adjacent small-capacity through hole.

FIGS. 4A to 4D, FIGS. 5A to 5F, and FIGS. 6A to 6D are cross-sectional views each showing schematically a part of a cross-section of a porous member constituting an aggregation type honeycomb structured body according to the present invention. Since shapes in cross-sections of large-capacity through holes and small-capacity through holes in an integral type honeycomb structured body are in the same combination as that of the aggregation type honeycomb structured body, shapes in the cross-sections of large-capacity through holes and small-capacity through holes in the honeycomb structural bodies of the present invention will be described by referring to these figures.

Figure 4A:
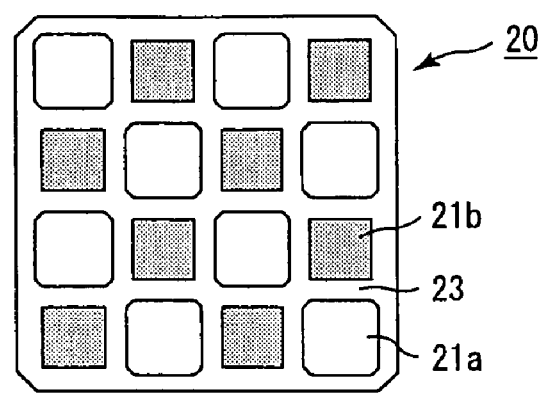
FIGS. 4A to 4D are cross-sectional views each showing schematically a cross-section perpendicular to the length direction of a porous member constituting still another example of a honeycomb structured body according to the present invention.
Figure 4B:
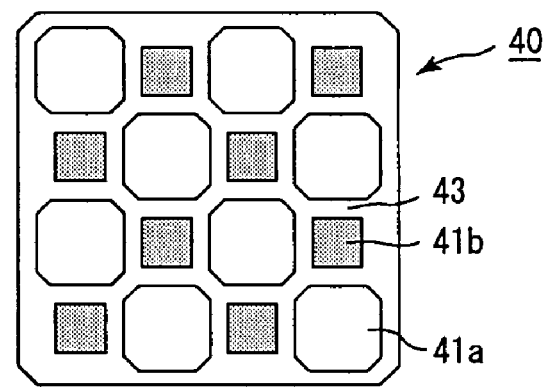
Figure 4C:
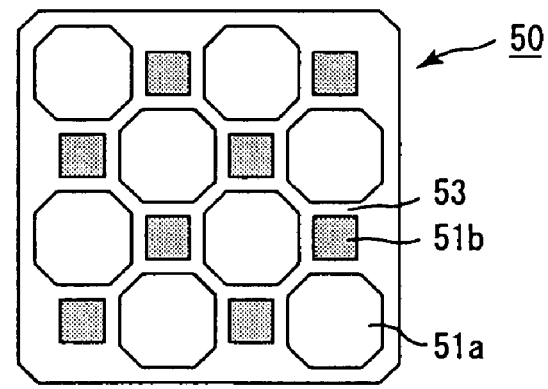
Figure 4D:
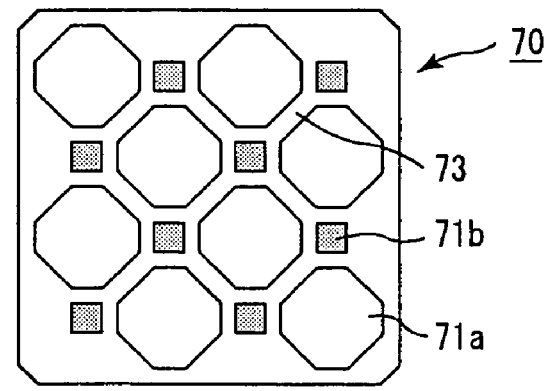

In FIG. 4A, an aperture ratio (a cross-sectional area of a large-capacity through hole/a cross-sectional area of a small-capacity through hole) is about 1.55, it is about 2.54 in FIG. 4B, it is about 4.45 in FIG. 4C, and it is about 6.00 in FIG. 4D, respectively. Furthermore, all the aperture ratios are about 4.45 in FIGS. 5A, 5C, and 5E, while all of them are about 6.00 in FIGS. 5B, 5D, and 5F, respectively. Moreover, the aperture ratio is about 1.55 in FIG. 6A, it is about 2.54 in FIG. 6B, it is about 4.45 in FIG. 6C, and it is about 6.00 in FIG. 6D, respectively.

In FIGS. 4A to 4D, each of all the large-capacity through holes has a cross-section of an octagonal shape, while each of all the small-capacity through holes has a cross-section of an quadrangular shape, and they are located alternately. When each cross-sectional area of the small-capacity through holes is changed, and each cross-sectional area of the large-capacity through holes is slightly changed, its aperture ratio can be easily modified arbitrarily. In accordance with the same manner as that described above, aperture ratios of the honeycomb structural bodies shown in FIGS. 5A to 5F, and FIGS. 6A to 6D may be arbitrarily modified.

As mentioned above, when cross-sections of a number of through holes are in a combination of an octagonal shape and a quadrangle, its symmetric property is fine. Since the symmetric property is good in the cross-sections, exhaust gases flow easily and uniformly into large-capacity through holes. In addition, improvement of a compression strength, an isostatic strength and the like can be achieved, whereby a compression strength and an isostatic strength within the above-mentioned desirable range are obtained.

The following description discusses the compression strength of the A axis. The compression strength of the A axis is calculated as follows. That is: In a honeycomb shape, a three-dimensional structure containing at least two planes perpendicular to the through hole (more preferably, a rectangular parallelepiped with the rest four planes being cut in parallel with each other or a cubic shape) is cut out, and this is placed with the through hole being set perpendicular to the base, and load pressures are applied from above in a sandwiched manner, so that the strength is calculated based upon the load at the time of breakage.

In the case where all the shapes of the cross-sectional areas are the square shape as shown in the conventional technique, all the loads are applied onto the A axis with the same pressure.

Here, in the case where the shapes include: the octagonal shape; and the quadrangle shape, the compressing force is dispersed into a force for expanding the octagonal shape, a force for squashing the quadrangle shape and other forces, and with respect to the wall shared by adjacently located large-capacity through holes, these forces are cancelled with one another; thus, the compressing force is presumably increased In the same manner, with respect to the isostatic strength also, in comparison with the case where all the cross-sectional areas have the square shape, since beams are also formed in diagonal directions, it becomes possible to easily improve the strength in the same manner. Here, an isostatic strength means a strength at which destruction appears in the case when a static pressure is applied to a honeycomb structured body from a surrounding area.

As mentioned above, it may be considered that when a variety of factors such as stability as to strength, a gas flow, and propagation of heat are overlapped with each other, a honeycomb structured body excellent in durability at the time of regeneration of the particulates is obtained.

In a honeycomb structured body of the present invention, it is desired that a cross-sectional area in a honeycomb shape is not changed from a flow-in side to a flow-out side of exhaust gases. This is because when a cross-sectional area of a through hole is changed, for example, in a state of the compression strength as mentioned above, a decrease in the compression strength is caused, so that it becomes difficult to manufacture a honeycomb structured body in accordance with compression molding.

Figure 5A:
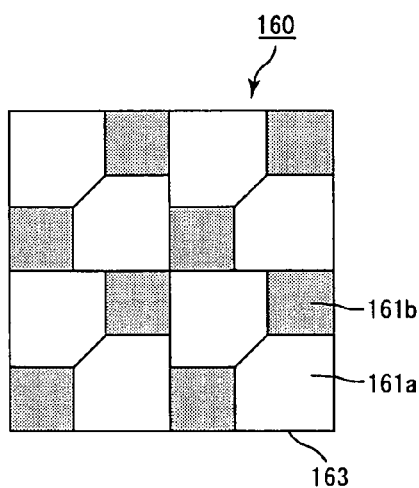
FIGS. 5A to 5F are vertical cross-sectional views each showing schematically a cross-section perpendicular to the length direction of a porous member constituting a further example of a honeycomb structured body according to the present invention.
Figure 5B:
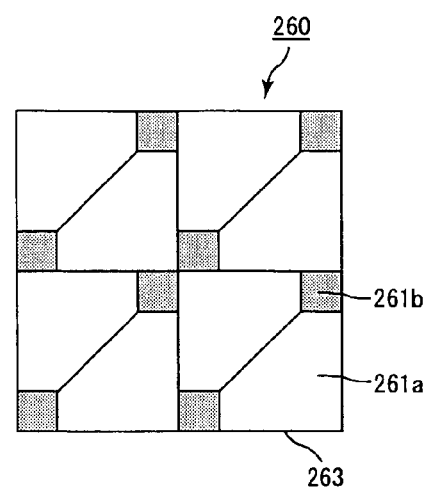
Figure 5C:
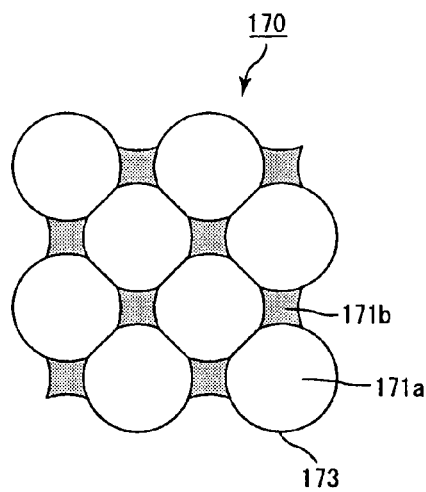
Figure 5D:
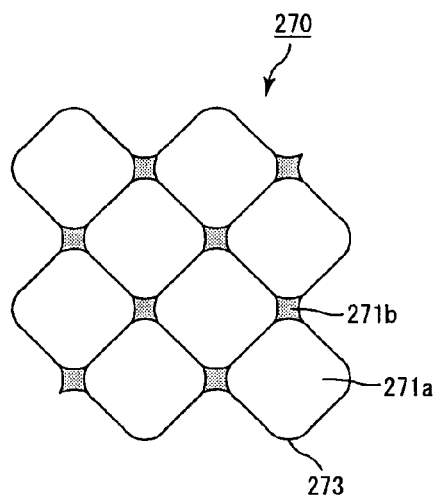

In honeycomb structural bodies 160 and 260 shown in FIGS. 5A and 5B, shapes in cross-sections of large-capacity through holes 161a and 261a are pentagonal shapes wherein three angles in each pentagon are almost right angles, while shapes in cross-sections of small-capacity through holes 161b and 261b are quadrangles wherein they are arranged in such that two small quadrangles occupies portions opposed obliquely to each other. Honeycomb structural bodies 170 and 270 shown in FIGS. 5C and 5D are obtained by modifying shapes in a cross-section shown in each of FIGS. 4A to 4D wherein a partition wall shared in common by a large-capacity through hole 171a and a small-capacity through hole 171b as well as a partition wall shared in common by a large-capacity through hole 271a and a small-capacity through hole 271b are expanded with a certain curvature towards a small-capacity through hole side, respectively, in which the curvature may be arbitrary.

A curve defining the partition wall shared in common by the large-capacity through hole 171a and the small-capacity through hole 171b, or the partition wall shared in common by the large-capacity through hole 271a and the small-capacity through hole 271b which corresponds to a quarter circle is illustrated herein. In this case, a shape wherein its aperture ratio becomes the minimum is given by almost a shape shown in FIG. 5C, and the aperture ratio in this case is almost 3.66.

Figure 5E:
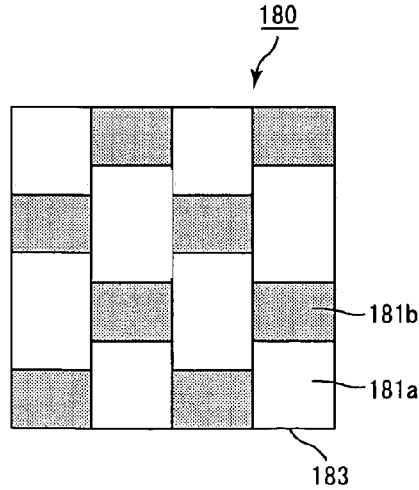
Figure 5F:
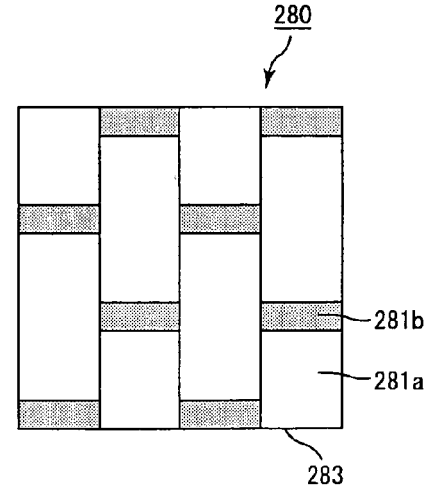

In honeycomb structural bodies 180 and 280 shown in FIGS. 5E and 5F, large-capacity through holes 181a and 281a as well as small-capacity through holes 281b and 281b are quadrangles (rectangles), respectively. As shown in each of FIGS. 5E and 5F, it may be configured such that two large-capacity through holes are combined with two small-capacity through holes so as to obtain a substantially square shape configuration. In this arrangement, a deformation of a honeycomb structured body can be prevented at the time of manufacturing the same.

When shapes and alignments of the through holes are the same as those mentioned above, a total length (a) of a wall portion shared in common by a large-capacity through hole and the adjacently located large-capacity through hole in a cross-section perpendicular to the length direction and a total length (b) of a wall portion shared in common by a large-capacity through hole and the adjacently located small-capacity through hole in a cross-section perpendicular to the length direction vary with an almost constant relation in accordance with a variation of the aperture ratio.

In the honeycomb structured body containing large-capacity through holes and small-capacity through holes, both having a variety of shapes, ratio of an area in a cross-section of the large-capacity through hole to that of the small-capacity through hole is desirably at least about 1.55 and at most about 2.75, more desirably in the range of about 2.0 to about 2.54, and even more desirably in the range of about 2.0 to about 2.42. By setting the aperture ratio at such ranges, a pressure loss can be further decreased at the time of collecting particulates, and further a regeneration limit value can be increased.

The term "regeneration limit value" means a collection amount (g/l) of particulates wherein when a much more amount of particulates is collected, there is such fear that cracks and the like appear in a honeycomb structured body, resulting in a damage of the honeycomb structured body in case of regeneration therefor. Accordingly, when such regeneration limit value increases, an amount of particulates which can be collected before a required regeneration is carried out may be increased, so that a period of time up to the required regeneration can be prolonged.

In a honeycomb structured body according to the present invention, a catalyst may be supported by a surface and/or an inside of a partition wall separating a number of through holes from one another.

An example of the catalyst includes the ones by which CO, HC, and $NO_x$ contained in exhaust gases can be converted.

When such a catalyst is supported by a honeycomb structured body according to the present invention, it is served for a honeycomb structured body for collecting particulates in exhaust gases, and at the same time, served for a catalyst converter for converting CO, HC, and $NO_x$ contained in the exhaust gases. Catalysts which can be supported by a honeycomb structured body of the present invention are not limited to the above-mentioned noble metals, but any catalyst may be supported so far as such catalyst can purify CO, HC, $NO_x$ and the like contained in exhaust gases.

Either the above-mentioned catalyst may be supported on surfaces of particles constituting a honeycomb structured body of the invention while remaining air pores, or it may be supported on the wall portion with a certain thickness thereof. Furthermore, the above-mentioned catalyst may be supported uniformly on surfaces of the wall portion of through holes, or it may be supported on a certain place in a concentrated state. Particularly, when the above-mentioned catalyst is supported on surfaces of the wall portion in through holes on an inlet side, surfaces of particles in the peripheries of these surfaces, or both of these surfaces, combustion of particulates can be efficiently carried out, because the particulates are easily in contact with the above-mentioned catalyst.

In case of supporting a catalyst on the above-mentioned honeycomb structured body, it is desired that convex portions and/or concave portions for supporting a catalyst are/is formed inside a number of through holes in parallel to the length direction thereof in the honeycomb structured body.

Convex portions or concave portions have been previously formed on the above-mentioned partition wall. Then, when a base material of the honeycomb structured body is impregnated into a solution containing a catalyst or a catalyst material and the base material is taken out from the solution, droplets of the solution can be maintained around the convex portions or inside the concave portions (grooves) by means of surface tension of the solution, and thereafter, when the base material of the honeycomb structured body is dried by heating, a large amount of the catalyst can be supported on the convex portions or concave portions. Furthermore, when convex portions or concave portions are formed, an area of the honeycomb structured body increases, so that it becomes possible to collect much more particulates. In other words, such convex portions or concave portions function as a site for collecting particulates.

Moreover, the convex portions or concave portions can moderate heat resistant stress in the case when a temperature of the honeycomb structured body rises or drops. In other words, the convex portions or concave portions function as a site for improving thermal stress.

In honeycomb structural bodies 110, 120, 130, and 140 shown in FIGS. 6A to 6D, the portions of the partition wall for separating large-capacity through holes 111a, 121a, 131a, and 141a from one another are provided with convex portions 114, 124, 134, and 144, respectively. Each cross-section of the large-capacity through holes 111a, 121a, 131a, and 141a has an octagonal shape, if the convex portions 114, 124, 134, and 144 are ignored. On one hand, each cross-section of small-capacity through holes 111b, 121b, 131b, and 141b has a quadrangular shape. These large-capacity through holes 111a, 121a, 131a, 141a and small-capacity through holes 111b, 121b, 131b, 141b are located alternately.

Although the shape of the convex portions is not specifically limited, but it is desired that the shape has a shape by which droplets can be easily maintained, and at the same time a strength of a certain degree can be ensured. Specifically, it is desired that the shape has a shape which widens towards the base thereof. Moreover, it is desirable that each of the convex portions is continuously formed from the end of an inlet side to the end of an outlet side in the honeycomb structured body, where by a high strength can be obtained, besides it becomes possible to manufacture such convex portions by extrusion forming.

Although a height of the above-mentioned convex portion is not specifically limited, it is desirable that the height is at least about 0.02 and at most about 6.0 times the thickness of a partition wall separating adjacently located large-capacity through holes from one another. When the height is at least about 0.02 and at most about 6.0 times the thickness, a sufficient amount of a catalyst can be supported on the convex portion and the peripheries thereof, and since a strength of the convex portion becomes sufficient, the convex portion will not be damaged by exhaust gases pressure and the like.

Although the shape of the concave portions is not specifically limited, but it is desired that the shape has a shape by which droplets can be easily maintained. Specifically, it is desired that the shape has a recessed or grooved shape. Moreover, it is desirable that each of the concave portions is continuously formed from the end of an inlet side to the end of an outlet side in the honeycomb structured body, whereby it becomes possible to manufacture such concave portions by extrusion forming.

Although a depth of the above-mentioned concave portion is not specifically limited, it is desirable that the depth is at least about 0.02 and at most about 0.4 times the thickness of a partition wall separating adjacently located large-capacity through holes from one another. When the depth is at least about 0.02 and at most about 0.4 times the thickness of the partition wall, a sufficient amount of a catalyst can be supported on the convex portion and the peripheries thereof, and since strength of the partition wall becomes sufficient, the partition wall will not be damaged by exhaust gases pressure and the like.

The number of convex portions or concave portions is not specifically limited, but each single convex portion or concave portion, or a plurality of convex portions or concave portions may be formed per each single partition wall for separating the respective adjacently located large-capacity through holes from one another.

Furthermore, it is desired that the convex portions and/or concave portions for supporting a catalyst are formed on the portions of the partition wall shared in common by inlet side-through holes.

In this situation, particularly, a catalyst may be selectively applied easily.

An example of the above-mentioned catalyst includes noble metals such as platinum, palladium, and rhodium. A catalyst comprising these noble metals is a so-called three-way catalyst. A honeycomb structured body according to the present invention wherein such three-way catalyst has been supported has the same functions as that of a heretofore well-known catalyst converter. Accordingly, a detailed explanation of a case where the honeycomb structured body of the present invention functions as a catalyst converter is omitted.

In a honeycomb structured body according to the present invention, it is desirable that a cross-sectional area of the honeycomb structured body is not varied from its flow-in side to its flow-out side of exhaust gases. It is because an improvement of compression strength and the like can be achieved, and it becomes easy to manufacture the honeycomb structured body by means of extrusion forming in accordance with such arrangement as described above.

It is desired that a honeycomb structured body according to the present invention has an isostatic strength of about 7 MPa or more, and about 9 MPa or more is more desirable.

When an isostatic strength is within the above specified range, excellent durability is obtained with respect to regeneration of particulates.

Isostatic strength is also called by the name of isotropic pressure fracture strength which means a strength in the case when a honeycomb structured body is destroyed by applying an isotropic pressure such as hydrostatic pressure to the honeycomb structured body.

It is desirable that the above-mentioned honeycomb structured body has a compression strength along A-axis of about 18 MPa or more, and more desirable is about 25 MPa or more.

When a compression strength along A-axis is within the above specified range, excellent durability is obtained with respect to regeneration of particulates.

Materials are not specified for the honeycomb structural bodies according to the present invention. An example of the materials includes nitride ceramics such as aluminum nitride, silicon nitride, boron nitride, and titanium nitride; carbide ceramics such as silicon carbide, zirconium carbide, titanium carbide, tantalum carbide, and tungsten carbide; and oxide ceramics such as alumina, zirconia, cordierite, and mullite. The material may be composed of two or more components, for example, it may be a composite material of silicon and silicon carbide, or aluminum titanate. A further example of the material includes Fe.Cr.Al-base metals such as spinel, lithium aluminum silicate, chromium-base stainless steels, and chromium-nickel base stainless steels as well as metallic silicon and the like.

Among these materials, it is desired that a major constituent thereof is at least one member selected from SiC, $Si_3N_4$, aluminum titanate, cordierite, mullite, alumina, spinel, lithium alumina silicate, Fe.Cr.Al-base metals, and metallic silicon.

Particularly, silicon carbide having high thermal resistance, high heat conductivity and being excellent in mechanical properties is desirable.

When the above-mentioned material for a honeycomb structured body is a metal, the metallic material is a porous member. In this respect, an example of porous metallic member includes a structural body constituted by metal fibers made of a metal as mentioned above in a three-dimensionally involved state, a structural body made of a metal as mentioned above wherein air pits are formed by the use of a pore forming agent, and a structural body prepared by sintering a metal powder made of a metal as mentioned above so as to remain pores in the structural body.

When a material for the above-mentioned honeycomb structured body is principally made of a metal, a honeycomb structured body having a lower pressure loss can be realized, even if the whole structure of the honeycomb structured body is made to be high porosity, because a sufficient strength can be ensured. Furthermore, in this case, an appearance of a gap and the like between the honeycomb structured body and a casing (metallic container) due to a difference in thermal expansion of them can be more effectively prevented. Moreover, since metal is excellent in thermal conductivity, its thermal equality can be improved, whereby a purification ratio of particulates can be improved in a regeneration process. In addition, since its thermal capacity becomes small, it becomes possible to rapidly raise a temperature by means of exhaust heat discharged from an internal combustion engine. It may be considered that when the honeycomb structured body is used in such a manner that it is installed immediately beneath an engine, and exhaust heat from the engine is effectively utilized, so that such honeycomb structured body is superior.

According to the honeycomb structured body of the present invention, since the relation between the volume Y of the honeycomb structured body and the aperture ratio X on the inlet side satisfies of the above-mentioned inequality (1), a life of the honeycomb structured body can be prolonged while keeping a size thereof in a compact state. Besides, since the honeycomb structured body has an excellent mechanical strength and thermal responsiveness, high critical value for the appearance of cracks, so that it exhibits excellent reliability.

In the following, an example of a method for manufacturing a honeycomb structured body as mentioned above will be described. In the case where a structure of the honeycomb structured body is an integral type honeycomb structured body as shown in FIGS. 3A and 3B, and the whole of which is constituted by a single sintered body, first, extrusion forming is carried out by the use of a raw material paste containing ceramics as mentioned above as its major constituent to manufacture a formed body having the same configuration as that of the honeycomb structured body 30 shown in FIGS. 3A and 3B.

The above-mentioned raw material paste is not specifically limited, but any raw material paste is applicable so far as the resulting porous block after manufacturing has a porosity of at least about 20% and at most about 80%. An example of the raw material pastes includes a mixture prepared by adding a binder and a dispersant liquid to a powder of ceramics as mentioned above.

The above-mentioned binder is not specifically limited. An example of which includes methyl cellulose, carboxymethyl cellulose, hydroxyethyl cellulose, polyethylene glycol, phenolic resins, epoxy resins and the like.

A blending quantity of the binder is desirably about 1 to about 10 parts by weight with respect to 100 parts by weight of a ceramic powder usually based thereon.

The above-mentioned dispersant liquid is not specifically limited, and an example of which includes organic solvents such as benzene; alcohols such as methanol; and water.

A suitable amount of the dispersant liquid is blended in such that a viscosity of a raw material paste is within a certain range.

These ceramic powder, binder, and raw material paste are blended by means of an attritor or the like, kneaded sufficiently with a kneader or the like, and then, the resulting mixture is subjected to extrusion forming to produce the above-mentioned formed body.

A molding auxiliary may be added to the above-mentioned raw material paste based on necessity.

The molding auxiliary is not specifically limited, and an example of which includes ethylene glycol, dextrin, fatty acid soap, polyalcohols and the like.

Furthermore, to the above-mentioned raw material paste, a pore forming agent such as a balloon containing oxide-base ceramics as its component and being micro hollow sphere, spherical acryl particles, and graphite may be added based on necessity.

The above-mentioned balloon is not specifically limited, and an example of which includes alumina balloon, glass micro balloon, shirasu balloon, fly ash balloon (FA balloon), mullite balloon and the like. Among others, the fly ash balloon is desirable. Moreover, a metal such as silicon may be blended with the above-mentioned raw material paste, or a raw material paste containing a metal as its major constituent may be used.

The above-mentioned formed body is dried by the use of a microwave dryer, a hot-air dryer, a dielectric dryer, a reduced-pressure dryer, a vacuum dryer, freeze dryer or the like, and then, each of predetermined through holes in the formed body is filled with a sealing material (plug) paste turning into a plug thereby to implement pore-sealing treatment upon the through holes.

A material for the sealing material (plug) paste is not specifically limited, but any material is applicable so far as the resulting plug obtained through the following step has a porosity of at least about 20% and at most about 80%. For instance, the same material as the above-mentioned raw material paste is applicable. In this case, however, it is desirable that such material is prepared by adding a lubricant, a solvent, a dispersant, and a binder to a powder used in the raw material paste. Because of this modification, it becomes possible to prevent sedimentation of particles in the sealing material paste in the middle of the mouth sealing treatment.

Thereafter, when a dried body wherein each of the through holes is filled with the sealing material (plug) paste is degreased and sintered under a predetermined condition, a honeycomb structured body made of porous members and the whole of which is constituted by a single sintered body can be manufactured.

A condition applied heretofore in the course of manufacturing a honeycomb structured body composed of porous members may be applied to the above-mentioned predetermined condition for degreasing and sintering the dried body.

In the case where a structure of a honeycomb structured body is an aggregation type honeycomb structured body wherein a plurality of porous members is bound through sealing material layer, respectively, as shown in FIG. 1, first, a raw material paste containing the above-mentioned ceramics as its major constituent is subjected to extrusion forming to produce a raw formed body having a shape of the porous member 20 shown in FIGS. 2A and 2B.

As the raw material paste, the same raw material paste as that explained in the above-mentioned aggregation type honeycomb structured body is applicable. Further, a metal such as silicon powder may be blended with the raw material paste, or a raw material paste containing a metal as its major constituent may be used.

Then, the raw formed body is dried by the use of a microwave dryer or the like to obtain a dried body. Thereafter, each of predetermined through holes in the dried body is filled with a sealing material (plug) paste turning into a plug thereby to implement pore-sealing treatment upon the through holes.

As the sealing material (plug) paste, the same sealing material (plug) paste as that explained in the above-mentioned integral type honeycomb structured body is applicable. In the above-mentioned pore-sealing treatment, the same manner as that of the above-mentioned integral type honeycomb structured body is applicable except that target through holes to be filled with a sealing material (plug) paste are different from those of the aggregation type honeycomb structured body.

Thereafter, the dried body after the pore-sealing treatment is degreased and sintered under a predetermined condition, whereby porous members wherein a plurality of through holes are placed in parallel with one another in the length direction through the partition wall can be manufactured.

As the predetermined condition for degreasing and sintering the above-mentioned raw formed body, a condition used heretofore in case of manufacturing a honeycomb structured body configured by binding a plurality of porous members through a sealing material layer, respectively, is applicable.

Then, the porous member 20 is placed on a base in an tilted manner, the upper cross-section of the pedestal being in V-shaped so as to be capable of stacking the porous member 20 while maintaining an obliquely inclined state thereof. Thereafter, two sides of the porous member faced to the upper direction are coated with a sealing material paste turning into the sealing material layer 14 with a uniform thickness to form the sealing material layers. A step for laminating sequentially another porous member 20 on the sealing material paste layer is repeated to produce a laminated body of a predetermined size and composed of rectangular pillar-shaped porous members 20.

A material for constituting the sealing material paste is the same as that explained in the honeycomb structured body according to the present invention, so that the explanation therefor is omitted herein.

Then, the laminated body composed of the porous members 20 is heated to dry and cure the sealing material paste layer to obtain the sealing material layer 14. Thereafter, the outer circumference of the laminated body is cut out into a shape as shown in FIGS. 3A and 3B by means of, for example, a diamond cutter, whereby the porous block 15 is formed.

When the sealing material layer 13 is formed on the outer circumference of the porous block 15 by applying the above-mentioned sealing material paste on the outer circumference thereof, a honeycomb structured body configured by binding a plurality of the porous members through the sealing material layer can be manufactured.

Any of the honeycomb structural bodies thus manufactured has a cylindrical shape, and the structures thereof are those shown in FIGS. 1, 3A and 3B.

Furthermore, when a honeycomb structured body according to the present invention relates to the one composed of metallic lamination members wherein the lamination members are laminated in the length direction in such that through holes are superposed one another, first, a porous metallic sheet having a thickness of at least about 0.1 mm and at most about 20 mm and made of a metal is subjected to laser beam machining, whereby a honeycomb-shaped laminated body wherein holes are formed on almost whole the surface of the laminated body with each almost equal distance, and through holes are formed at a high density is manufactured.

On one hand, when a lamination member which constitutes a sealing area having blind holes and positioned in the peripheries of an end of a honeycomb structured body of the present invention is manufactured, holes are allowed to be formed into in a checkered pattern in case of laser beam machining to manufacture a honeycomb-shaped lamination member on which through holes are formed in a low density.

Namely, when several pieces of such lamination members are used at the ends of a honeycomb structured body, the honeycomb structured body functioning as a filter can be obtained without accompanying a step for occluding predetermined through holes at the ends of the honeycomb structured body.

An application of a honeycomb structured body according to the present invention is not specifically limited, but it may be applied to a filter for a variety of use applications, and particularly desirable is to use a filter in an exhaust gas purifying device for vehicles.

Figure 7:
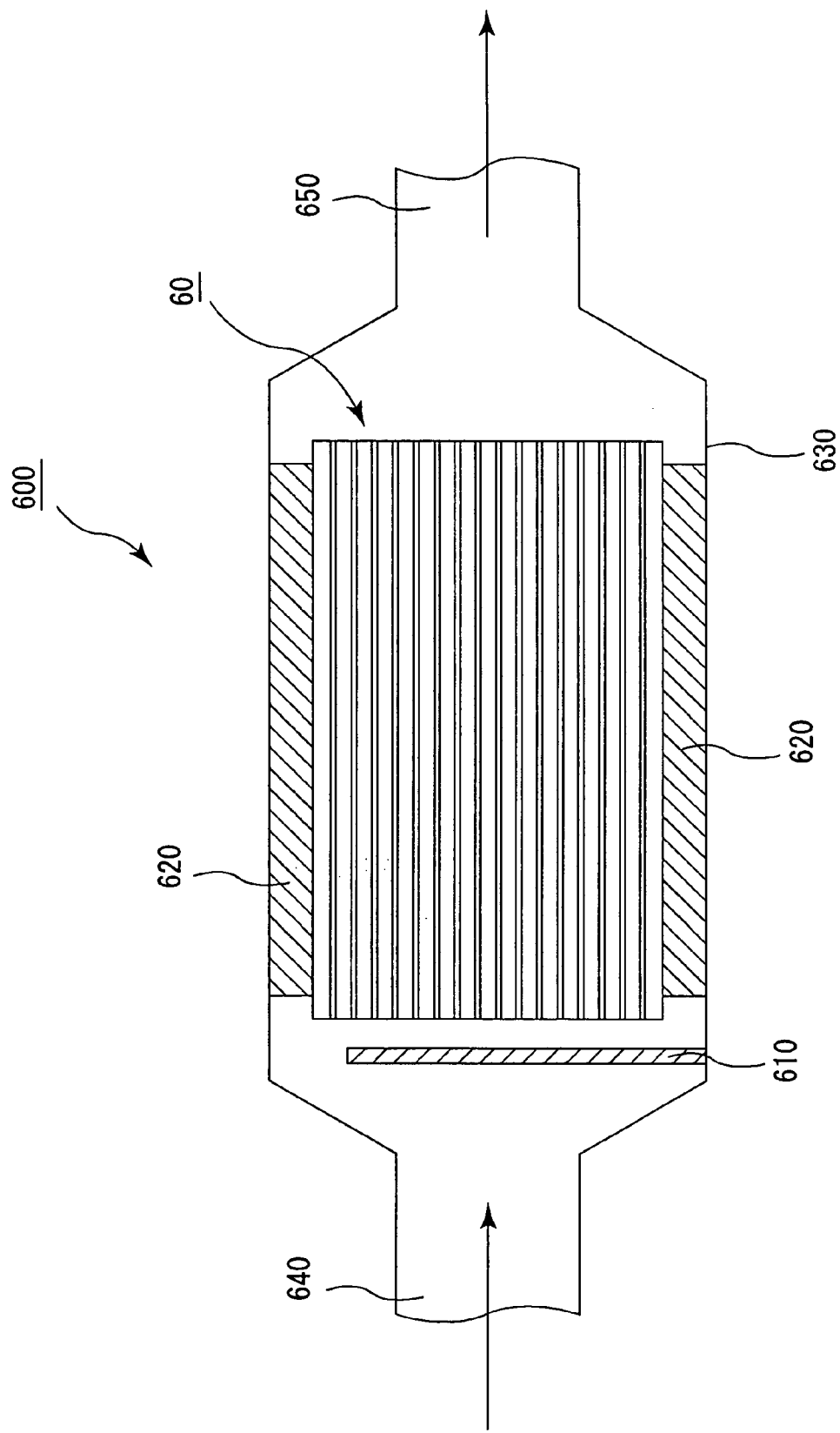
FIG. 7 is a cross-sectional view showing schematically an example of an exhaust gas purifying device wherein a honeycomb structured body for purifying exhaust gases according to the present invention is used.

FIG. 7 is a cross-sectional view showing schematically an example of an exhaust gas purifying device for vehicles wherein a honeycomb structured body according to the present invention is installed.

As shown in FIG. 7, an exhaust gas purifying device 600 is mainly configured by a honeycomb structured body 60 of the present invention, a casing 630 for covering the outer circumference of the honeycomb structured body 60, a holding seal member 620 disposed between the honeycomb structured body 60 and the casing 630, and a heating means 610 located at a flow-in side of exhaust gases in the honeycomb structured body 60 wherein an introduction pipe 640 linked to an internal combustion engine such as an engine is connected to an end of the casing 630 to the side of which the exhaust gases are introduced, and an exhaust pipe 650 linked to the outside is connected to the other end of the casing 630. It is to be noted that arrows in FIG. 7 indicate a flow of the exhaust gases.

The honeycomb structured body 60 in FIG. 7 may be either the honeycomb structured body 10 shown in FIG. 1 or the honeycomb structured body 30 shown in FIGS. 3A and 3B.

In the exhaust gas purifying device 600 having a constitution as described above, exhaust gases discharged from an internal combustion engine such as an engine are introduced into the casing 630 through the introduction pipe 640, and the exhaust gases pass through a wall portion (the partition wall) via through holes in the honeycomb structured body 60, whereby particulates contained in the exhaust gases are collected by the wall portion (the partition wall) to be purified, and then, the exhaust gases thus purified are discharged to the outside through the exhaust pipe 650.

As a result, when a large amount of particulates is deposited on the wall portion (the partition wall) in the honeycomb structured body 60 and a pressure loss increases, a regeneration process of the honeycomb structured body 60 is performed.

In the regeneration process, a gas heated by the heating means 610 is allowed to flow into the interiors of the through holes to heat the honeycomb structured body 60, whereby the particulates deposited on the wall portion (the partition wall) are burned off to remove them.

In accordance with a post injection method, particulates may be burned off and removed.

An exhaust gas purifying device wherein the honeycomb structured body according to the present invention is applied belongs also to the present invention.

EXAMPLES

In the following, although the present invention will be described in more detail in conjunction with examples, it is to be noted that the invention is not restricted by these examples.

Example 1

(1) Powder of α-type silicon carbide having an average particle diameter of 11 µm (60% by weight) and powder of β-type silicon carbide having an average particle diameter of 0.5 µm (40% by weight) were wet-mixed. To 100 parts by weight of the resulting mixture, 5 parts by weight of an organic binder (methyl cellulose) and 10 parts by weight of water were added and kneaded to obtain a mixed composition. Then, a small amount of a plasticizer and a lubricant was added to the mixed composition and further kneaded, and thereafter the resulting product was extrusion-molded, whereby a raw formed body wherein a cross-section of a large-capacity through hole is in an octagonal shape and a cross-section of a small-capacity through hole is in a quadrangular shape (substantially square-shape) as shown in FIGS. 4A to 4D was formed.

Next, the raw formed body was dried by the use of a microwave dryer and the like to obtain a ceramic dried body. Then, predetermined through holes in the ceramic dried body were filled with a paste having the same composition as that of the raw formed body, and dried again by the use of the dryer. Thereafter, the resulting product was degreased at 400° C., and sintered at 2200° C. for 3 hours under normal pressure argon atmosphere to manufacture a porous ceramic member 20 being a silicon carbide sintered body having 42% porosity, 9 µm average pore diameter, 34.3 mm×34.3 mm×150 mm dimension, the through hole number of 28/1 cm$^2$ (10 mm×10 mm) (the large-capacity through hole number of 14/1 cm$^2$, and the small-capacity through hole number of 14/1 cm$^2$), and almost 0.4 mm thickness in all the partition wall 23.

In the resulting porous ceramic member 20, only the large-capacity through holes 21a were sealed with a plug in either end of the porous ceramic member, while only the small-capacity through holes 21b were sealed with the plug in the other end thereof.

(2) A number of the porous silicon carbide members were bound by the use of a heat-resistant sealing material paste containing 30% by weight of alumina fibers having 0.2 mm fiber length, 21% by weight of silicon carbide particles having 0.6 µm average particle diameter, 15% by weight of silica sol, 5.6% by weight of carboxymethyl cellulose, and 28.4% by weight of water, and in succession, the resulting bound porous silicon carbide members were cut out by the use of a diamond cutter to form a cylindrical ceramic block.

In this case, it was arranged in such that a thickness of a sealing material layer for binding the porous ceramic members was 1.0 mm.

Next, 23.3% by weight of ceramic fibers made of alumina silicate (shot content: 3%, fiber length: 0.1 to 100 mm) as inorganic fibers, 30.2% by weight of silicon carbide powder having 0.3 µm average particle diameter as inorganic particles, 7% by weight of silica sol (SiO$_2$ content in sol: 30% by weight) as an inorganic binder, 0.5% by weight of carboxymethyl cellulose as an organic binder, and 39% by weight of water were blended and kneaded with each other to prepare a sealing material paste.

Next, a sealing material paste layer having 0.2 mm thickness was formed on the outer circumferential area of the ceramic block by using the sealing material paste. The sealing material paste layer thus obtained was dried at 120° C. to manufacture a filter of a cylindrical honeycomb structured body having 144 mm diameter, 2 liter filter volume, and 35.5% aperture ratio on the inlet side of the filter after sintering. The filter volume (a volume of the honeycomb structured body) was calculated from the outside dimension.

Examples 2 to 20 and Comparative Examples 1 to 15

(1) Porous ceramic members were manufactured in accordance with the same manner as that (1) of Example 1 except that each shape of large-capacity through holes was selected to be an octagonal shape, while each shape of small-capacity through holes was selected to be a quadrangle (substantially square shape) in each cross-sectional shape of the porous ceramic members as shown in FIGS. 4A to 4D, and each aperture ratio on the inlet side of the porous ceramic members after sintering was made to be each of values indicated in Tables 1 and 3.

(2) Filters of honeycomb structural bodies were manufactured by using the porous ceramic members manufactured in the above paragraph (1), respectively, in accordance with the same manner as that (2) of Example 1 except that each filter volume was made to be each of values indicated in Tables 1 and 3.

Examples 21 to 23

(1) Powder of α-type silicon carbide having an average particle diameter of 30 μm (80% by weight) and powder of metallic silicon having an average particle diameter of 4 μm (20% by weight) were wet-mixed. To 100 parts by weight of the resulting mixed powder, 6 parts by weight of an organic binder (methyl cellulose), 2.5 parts by weight of a surfactant (oleic acid), and 24 parts by weight of water were added and kneaded to obtain a raw material paste.

Then, an extrusion forming machine was filled with the raw material paste, and a raw formed body having almost the same shape as that of the porous member 30 shown in FIGS. 3A and 3B was formed at an extrusion rate of 10 cm/minute.

Next, the resulting raw formed body was dried by the use of a microwave dryer to obtain a dried body. Thereafter, predetermined through holes in the dried body were filled with a filler paste having the same composition as that of the raw formed body, and dried again by using the dryer. Then, the thus dried product was degreased at 550° C. for 3 hours under an oxidative atmosphere to obtain a degreased body.

Then, the degreased body was heated under the condition of at 1400° C. for 2 hours in an argon atmosphere to melt monocrystalline silicon, and silicon carbide particles were joined one another with silicon to manufacture a porous member having 45% porosity, 10 μm average pore diameter, and 34.3 mm×34.3 mm×305 mm dimension.

(2) A number of the porous members were bound by the use of a heat-resistant sealing material paste containing 30% by weight of alumina fibers having 0.2 mm fiber length, 21% by weight of silicon carbide particles having 0.6 μm average particle diameter, 15% by weight of silica sol, 5.6% by weight of carboxymethyl cellulose, and 28.4% by weight of water in accordance with the manner explained by referring to FIGS. 5A to 5F, and in succession, the resulting bound porous members were cut out by the use of a diamond cutter to form a cylindrical porous block having 190 mm in diameter.

In this case, it was arranged in such that a thickness of a sealing material layer for binding the porous members was 1 mm.

Next, 23.3% by weight of ceramic fibers made of alumina silicate (shot content: 3%, fiber length: 0.1 to 100 mm) as inorganic fibers, 30.2% by weight of silicon carbide powder having 0.3 μm average particle diameter as inorganic particles, 7% by weight of silica sol ($SiO_2$ content in sol: 30% by weight) as an inorganic binder, 0.5% by weight of carboxymethyl cellulose as an organic binder, and 39% by weight of water were blended and kneaded with each other to prepare a sealing material paste.

Next, a sealing material paste layer having 1.0 mm thickness was formed on the outer circumferential area of the porous block by using the sealing material paste. The sealing material paste layer thus obtained was dried at 120° C. to manufacture a filter of a cylindrical honeycomb structured body having a filter volume, and an aperture ratio on the inlet side of the filter shown in Table 1.

Examples 24 to 26

A degreased body was prepared in accordance with the same manner as that of Examples 21 to 23 except that a metallic silicon powder having 4 μm average particle diameter was wet-mixed to prepare a raw material paste. The degreased body was heated under the condition of at 1000° C. for 2 hours in an argon atmosphere to manufacture a porous member having 45% porosity, 10 μm average pore diameter, and 34.3 mm×34.3 mm×305 mm dimension. The porous members were bound in accordance with the same manner as that of Examples 21 to 23 to manufacture a filter of a cylindrical honeycomb structured body having 190 mm diameter.

Examples 27 to 40

(1) Porous ceramic members were manufactured in accordance with the same manner as that (1) of Example 1 except that each shape of large-capacity through holes was selected to be an pentagon, while each shape of small-capacity through holes was selected to be a quadrangle (substantially square shape) in each cross-sectional shape of the porous ceramic members as shown in FIGS. 5A and 5B, and each aperture ratio on the inlet side of the porous ceramic members after sintering was made to be each of values indicated in Table 2.

(2) Filters of honeycomb structural bodies were manufactured by using the porous ceramic members manufactured in the above paragraph (1), respectively, in accordance with the same manner as that (2) of Example 1 except that each filter volume was made to be each of values indicated in Table 2.

Examples 41 to 46 and Comparative Example 16

Porous ceramic members were manufactured in accordance with the same manner as that (1) of Example 1 except that each shape of large-capacity through holes was selected to be a rectangle, while each shape of small-capacity through holes was selected to be a rectangle (square shape depending on circumstances) in each cross-sectional shape of the porous ceramic members as shown in FIGS. 5E and 5F, and each aperture ratio on the inlet side of the porous ceramic members was made to be each of values indicated in Tables 2 and 3.

(2) Filters of honeycomb structural bodies were manufactured by using the porous ceramic members manufactured in the above paragraph (1), respectively, in accordance with the same manner as that (2) of Example 1 except that each filter volume was made to be each of values indicated in Tables 2 and 3.

Examples 47 to 52 and Comparative Example 17

(1) Porous ceramic members were manufactured in accordance with the same manner as that (1) of Example 1 except that a shape in a cross-section of each porous ceramic member was made to be that wherein a portion of the partition wall for separating adjacently located large-capacity through holes, each having almost the same cross-sectional shape as that of the porous ceramic member, from one another are provided with convex portions, respectively, as shown in FIGS. 6A to 6D, and each aperture ratio on the inlet side was made to be each of the values indicated in Tables 2 and 3.

(2) Filters of honeycomb structural bodies were manufactured by using the porous ceramic members manufactured in the above paragraph (1), respectively, in accordance with the same manner as that (2) of Example 1 except that each filter volume was made to be each of the values indicated in Tables 2 and 3.

Examples 53 to 56

(1) Porous ceramic members were manufactured in accordance with the same manner as that (1) of Example 1 except that each aperture ratio on the inlet side after sintering the porous ceramic member was made to be each of the values indicated in Table 4.

(2) Filters of honeycomb structural bodies each having a volume indicated in Table 4 were manufactured by using the porous ceramic members manufactured in the above paragraph (1), respectively, in accordance with the same manner as that (2) of Example 1 except that a heat-resistant sealing material (adhesive) paste containing 30% by weight of alumina fibers having 20 μm fiber length, 21% by weight of silicon carbide particles having 0.6 μm average particle diameter, 15% by weight of silica sol, 5.6% by weight of carboxymethyl cellulose, and 28.4% by weight of water was used as a sealing material (adhesive) paste, and a sealing material paste prepared by blending and kneading 23.3% by weight of ceramic fibers made of alumina silicate (shot content: 3%, fiber length: 5 to 100 μm), 30.2% by weight of silicon carbide powder having 0.3 μm average particle diameter, 7% by weight of silica sol ($SiO_2$ content in sol: 30% by weight), 0.5% by weight of carboxymethyl cellulose, and 39% by weight of water with each other was used as a paste for coating the outer circumference of a ceramic block.

Examples 57 to 59

(1) Porous ceramic members were manufactured in accordance with the same manner as that (1) of Examples 21 to 23 except that each aperture ratio on the inlet side after sintering the porous ceramic member was made to be each of the values indicated in Table 4.

(2) Filters of honeycomb structural bodies each having a volume indicated in Table 4 were manufactured by using the porous ceramic members manufactured in the above paragraph (1), respectively, in accordance with the same manner as that (2) of Examples 21 to 23 except that a heat-resistant sealing material (adhesive) paste containing 30% by weight of alumina fibers having 20 μm fiber length, 21% by weight of silicon carbide particles having 0.6 μm average particle diameter, 15% by weight of silica sol, 5.6% by weight of carboxymethyl cellulose, and 28.4% by weight of water was used as a sealing material (adhesive) paste, and a sealing material paste prepared by blending and kneading 23.3% by weight of ceramic fibers made of alumina silicate (shot content: 3%, fiber length: 5 to 100 μm), 30.2% by weight of silicon carbide powder having 0.3 μm average particle diameter, 7% by weight of silica sol ($SiO_2$ content in sol: 30% by weight), 0.5% by weight of carboxymethyl cellulose, and 39% by weight of water with each other was used as a paste for coating the outer circumference of a ceramic block.

Examples 60 to 62

Porous ceramic members were manufactured in accordance with the same manner as that of Examples 24 to 26 except that each aperture ratio on the inlet side after sintering the porous ceramic member was made to be each of the values indicated in Table 4.

Filters of honeycomb structural bodies each having a volume indicated in Table 4 were manufactured by using the resulting porous ceramic members, respectively, in accordance with the same manner as that of Examples 24 to 26 except that a heat-resistant sealing material (adhesive) paste containing 30% by weight of alumina fibers having 20 μm fiber length, 21% by weight of silicon carbide particles having 0.6 μm average particle diameter, 15% by weight of silica sol, 5.6% by weight of carboxymethyl cellulose, and 28.4% by weight of water was used as a sealing material (adhesive) paste, and a sealing material paste prepared by blending and kneading 23.3% by weight of ceramic fibers made of alumina silicate (shot content: 3%, fiber length: 5 to 100 μm), 30.2% by weight of silicon carbide powder having 0.3 μm average particle diameter, 7% by weight of silica sol ($SiO_2$ content in sol: 30% by weight), 0.5% by weight of carboxymethyl cellulose, and 39% by weight of water with each other was used as a paste for coating the outer circumference of a ceramic block.

Examples 63 to 67

(1) Porous ceramic members were manufactured in accordance with the same manner as that (1) of Example 1 except that each cross-sectional shape and each aperture ratio on the inlet side after sintering the porous ceramic member was made to be each of the values indicated in Table 4.

(2) Filters of honeycomb structural bodies each having a volume indicated in Table 4 were manufactured by using the porous ceramic members manufactured in the above paragraph (1), respectively, in accordance with the same manner as that (2) of Example 1 except that a heat-resistant sealing material (adhesive) paste containing 30% by weight of alumina fibers having 20 μm fiber length, 21% by weight of silicon carbide particles having 0.6 μm average particle diameter, 15% by weight of silica sol, 5.6% by weight of carboxymethyl cellulose, and 28.4% by weight of water was used as a sealing material (adhesive) paste, and a sealing material paste prepared by blending and kneading 23.3% by weight of ceramic fibers made of alumina silicate (shot content: 3%, fiber length: 5 to 100 μm), 30.2% by weight of silicon carbide powder having 0.3 μm average particle diameter, 7% by weight of silica sol ($SiO_2$ content in sol: 30% by weight), 0.5% by weight of carboxymethyl cellulose, and 39% by weight of water with each other was used as a paste for coating the outer circumference of a ceramic block.

Reference Examples 1 to 6

Figure 6A:
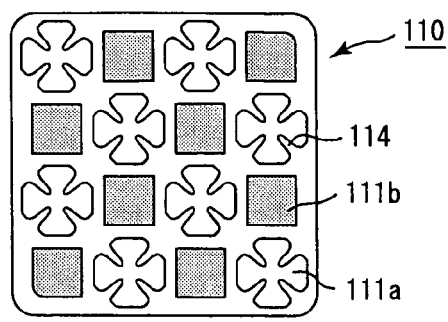
FIGS. 6A to 6D are vertical cross-sectional views each showing schematically a cross-section perpendicular to the length direction of a porous member constituting an yet further example of a honeycomb structured body according to the present invention.
Figure 6B:
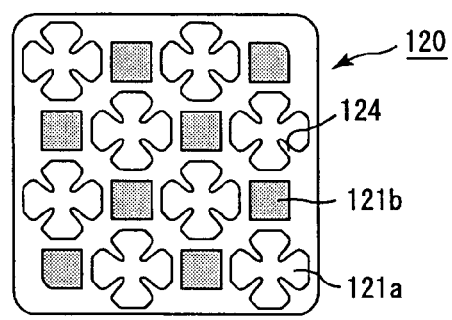
Figure 6C:
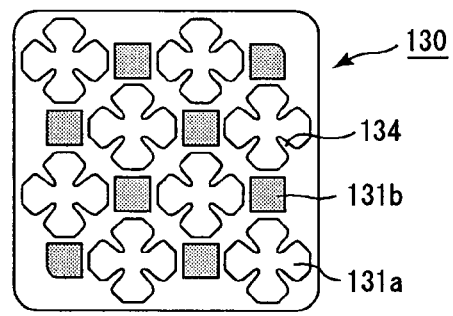
Figure 6D:
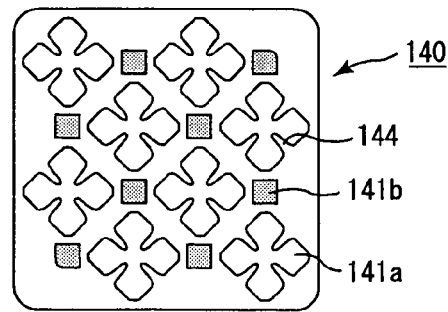
Figure 6E:
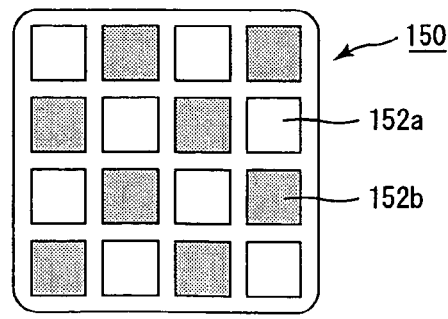
FIG. 6E is a vertical cross-sectional view showing schematically a cross-section perpendicular to the length direction of a porous member constituting a honeycomb structured body of a comparative example.

(1) Porous ceramic members were manufactured in accordance with the same manner as that (1) of Example 1 except that each cross-sectional shape of the porous ceramic members was made to be almost the same as that shown in FIG. 6E (all the shapes were square shapes and they were sealed in a checkered pattern) and each aperture ratio on the inlet side of the porous ceramic member was made to be each of the values indicated in Table 3.

(2) Filters of honeycomb structural bodies were manufactured by using the porous ceramic members manufactured in the above paragraph (1), respectively, in accordance with the same manner as that (2) of Example 1 except that each filter volume was made to be each of the values indicated in Table 3.

Figure 8:
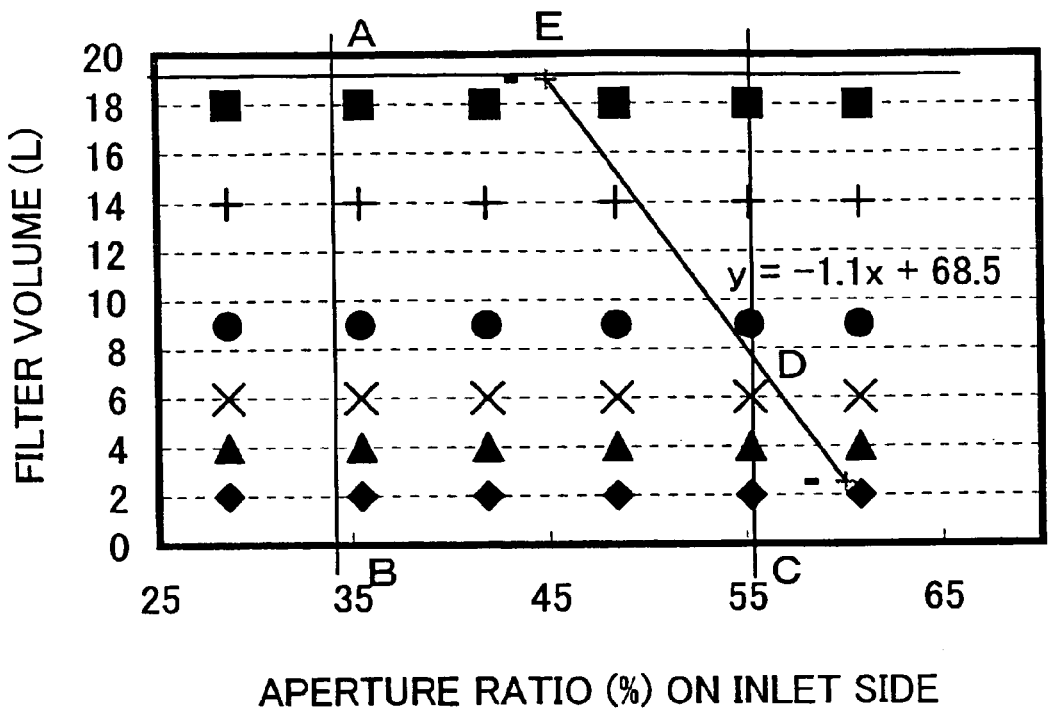
FIG. 8 is a graph indicating a relation between a filter volume and an aperture ratio on the inlet side of a filter composed of a honeycomb structured body according to the present invention.

FIG. 8 is a graph indicating a relation between a filter volume (a volume of a honeycomb structured body) (L) and an aperture ratio on an inlet side in the filters (honeycomb structural bodies) relating to examples, comparative examples, and reference examples. The results of the filters relating to the examples are plotted as points within a pentagon A B C D E shown in the figure, and they exhibit preferable values in also the following measurement.

Figure 9:
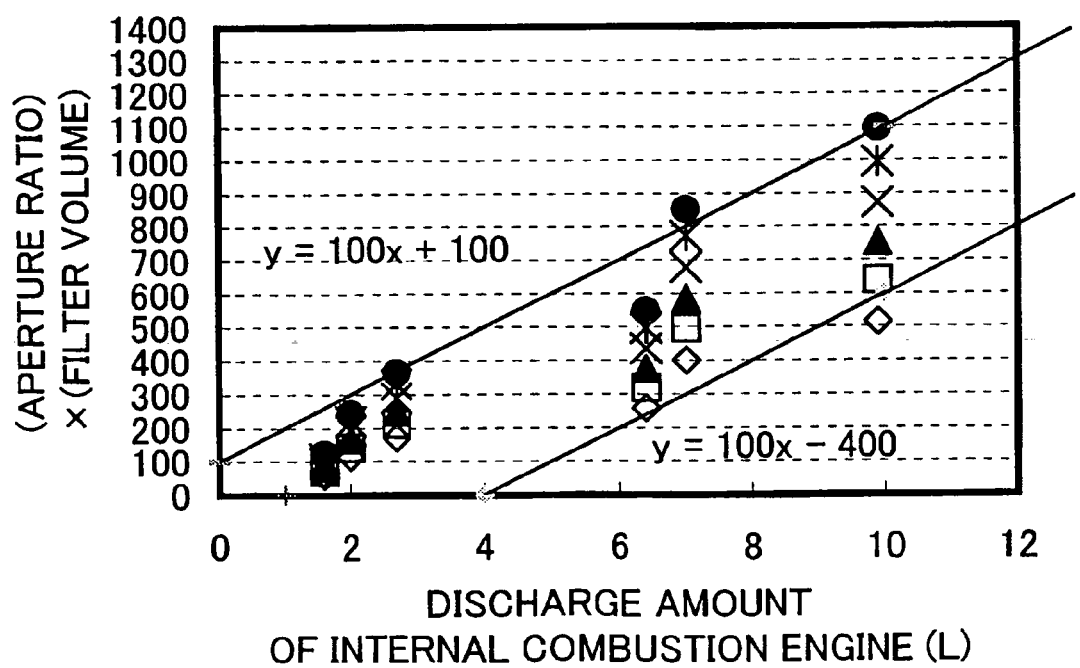
FIG. 9 is a graph indicating a relation between a product of a filter volume and an aperture ratio on the inlet side, and a discharge amount of a filter composed of a honeycomb structured body according to the present invention.

FIG. 9 is a graph indicating a relation between a product obtained from a aperture ratio on the inlet side and a filter volume, and a discharge amount.

A honeycomb structured body wherein a volume Y (L), an aperture ratio X (%) on the inlet side, and a discharge amount V (L) have the relation represented by the above-mentioned inequality (3) is within a range sandwiched in between the upper and lower functions.

(Evaluation Method)

(1) Measurement for Regeneration Limit Value

As shown in FIG. 7, each filter of a honeycomb structured body prepared in the examples and the comparative examples was placed in an exhaust gas passage for applying as an exhaust gas purifying device. In this state, the engine was driven at 3000 min$^{-1}$ rotational frequency and 50 Nm torque for a predetermined period of time to collect a predetermined amount of particulates. Thereafter, the engine was driven at 4000 min$^{-1}$ rotational frequency and applied a full load, so that when a filter temperature came to be constant at around 700° C., the engine was driven at 1050 min$^{-1}$ rotational frequency and 30 Nm torque, whereby the particulates were forcibly burned off.

An experiment for such regeneration process was carried out while changing a collection amount of particulates, whereby it was examined whether or not cracks appear on a filter. The experiment was made upon the respective examples, comparative examples, and test examples wherein the maximum amount of particulates based on which cracks do not appear was made to be a regeneration limit value, and the results thereof are shown in the following Tables 1 to 4.

Figure 10:
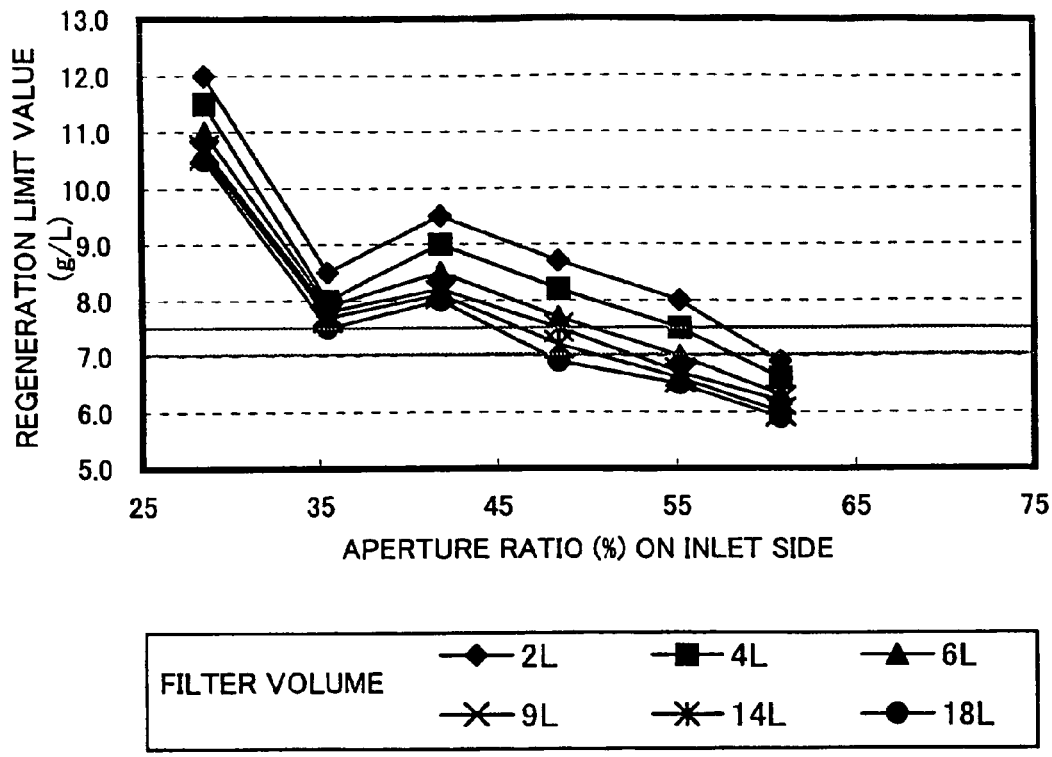
FIG. 10 is a graph indicating a relation between a filter volume on the inlet side and a regeneration limit value of a filter composed of a honeycomb structured body having each of cross-sectional shapes shown in FIGS. 4A to 4D.
Figure 11:
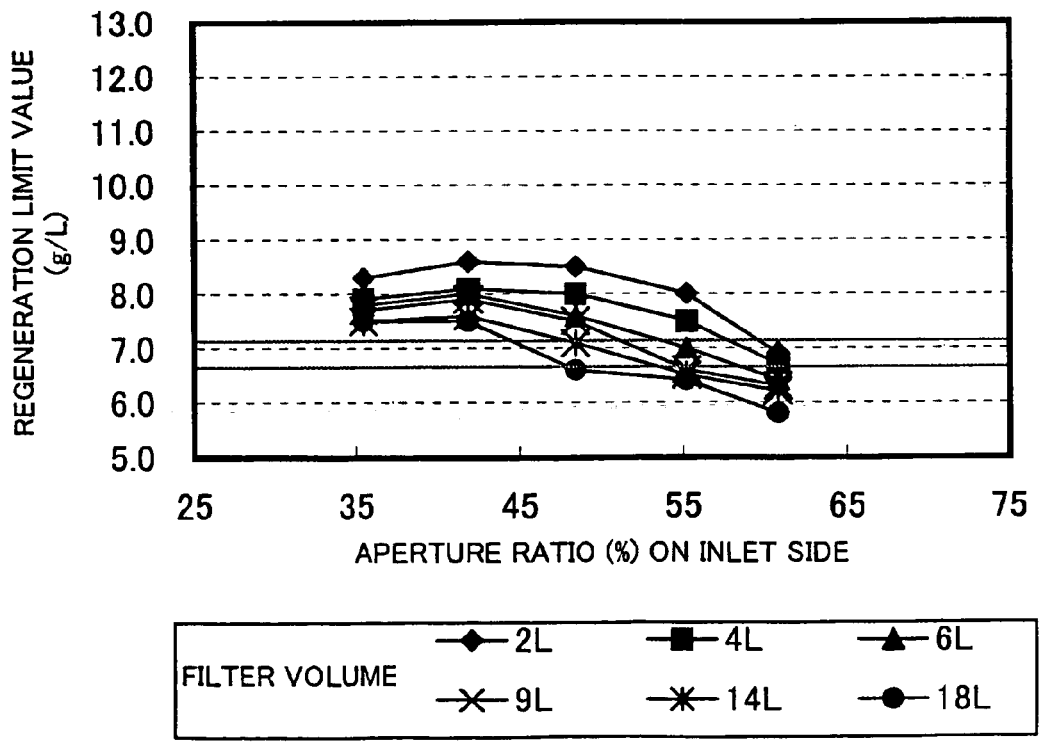
FIG. 11 is a graph indicating a relation between a filter volume on the inlet side and a regeneration limit value of a filter composed of a honeycomb structured body having each of cross-sectional shapes shown in FIGS. 5A and 5B.
Figure 12:
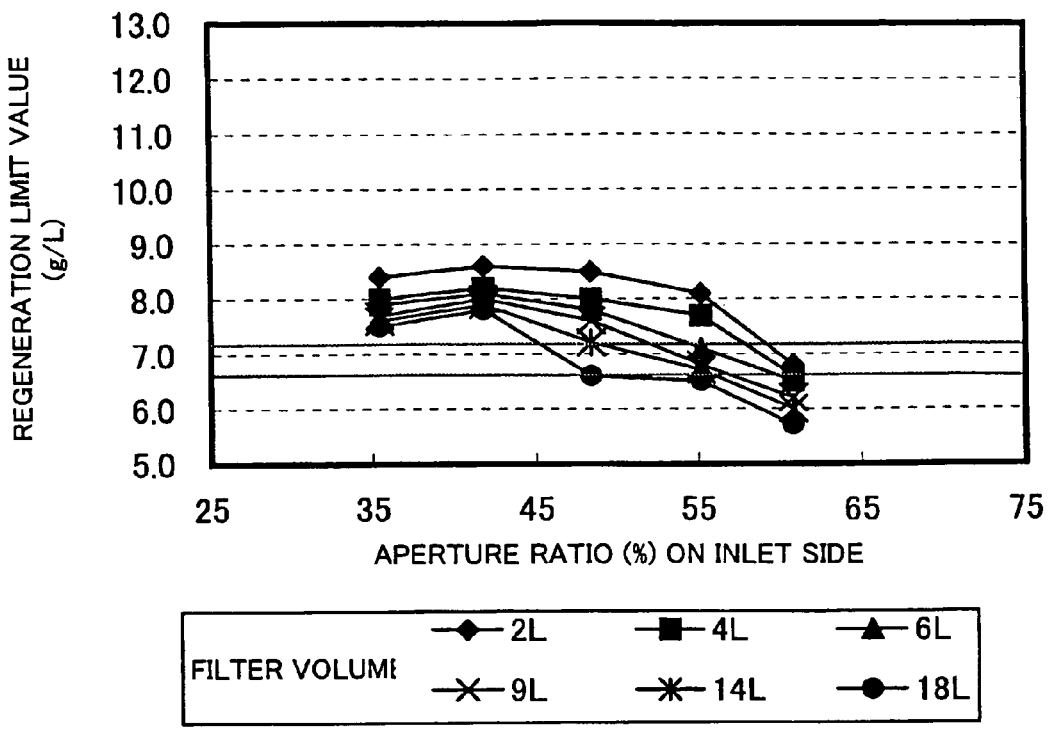
FIG. 12 is a graph indicating a relation between a filter volume on the inlet side and a regeneration limit value of a filter composed of a honeycomb structured body having each of cross-sectional shapes shown in FIGS. 5E and 5F.
Figure 13:
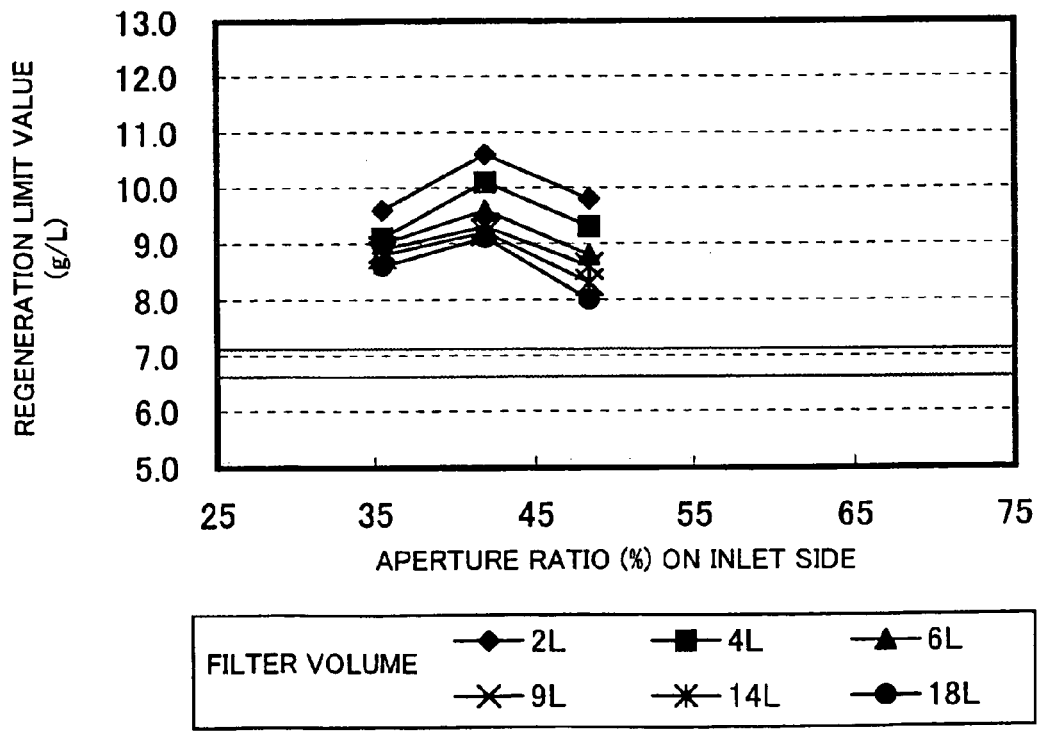
FIG. 13 is a graph indicating a relation between a filter volume on the inlet side and a regeneration limit value of a filter composed of a honeycomb structured body having each of cross-sectional shapes shown in FIGS. 6A to 6D.

Furthermore, a relation between an aperture ratio on the inlet side of a filter and a regeneration limit value was indicated with respect to each filter volume in a graph of FIG. 10 wherein filters have the cross-sectional shapes shown in FIGS. 4A to 4D, respectively; the relation was indicated also in a graph of FIG. 11 wherein filters have the cross-sectional shapes shown in FIGS. 5A and 5B, respectively; the relation was indicated also in a graphical representation of FIG. 12 wherein filters have the cross-sectional shapes shown in FIGS. 5E and 5F, respectively; and the relation was indicated also in a graph of FIG. 13 wherein filters have the cross-sectional shapes shown in FIGS. 6A to 6D, respectively. All the critical values of regeneration exhibited low values, and value 7 or less was frequently observed in the filters of the comparative examples except for the filters having the cross-sectional shapes shown in FIGS. 6A to 6D with no data.

(2) Thermal Responsiveness

As shown in FIG. 7, each filter of a honeycomb structured body prepared in the examples and the comparative examples was placed in an exhaust gas passage for applying as an exhaust gas purifying device. A thermometer was set out in the central portion of the filter, and in this state, the engine was driven at 3000 min$^{-1}$ rotational frequency and 50 Nm torque to collect 8 g/L of particulates. Thereafter, the engine was driven at 1250 min$^{-1}$ rotational frequency and 60 Nm torque, so that when its central temperature came to be constant, it was maintained for one minute. Thereafter, post injection was conducted to utilize an oxidation catalyst positioned at anterior of the filter, whereby an exhaust air temperature was raised to burn off the particulates. A condition for the post injection was set out in such that a central temperature of the honeycomb structured body became almost constant at 600° C. during one minute after the post injection was started.

Such one minute wherein a temperature was constant at 1250 min$^{-1}$ rotational frequency and 60 Nm torque, and a total period of time until a flammability peak appeared in the central temperature of a honeycomb structured body as a result of burning out particulates in the following post injection were measured, whereby thermal responsiveness was evaluated, and the results thereof are shown in Tables 1 to 4.

Figure 14:
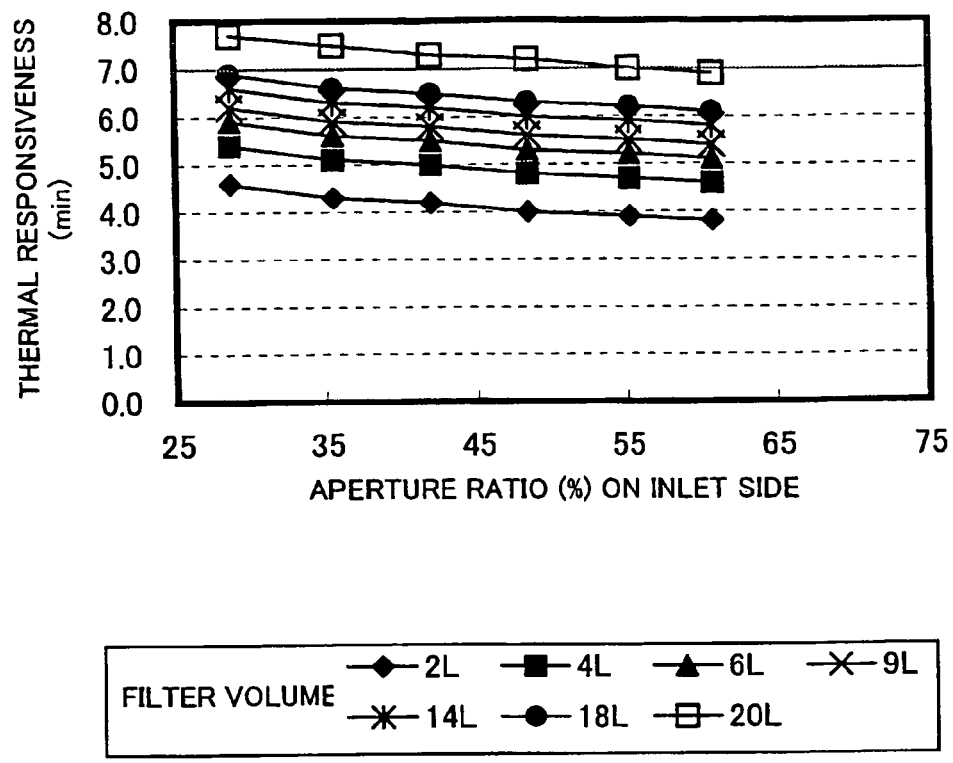
FIG. 14 is a graph indicating a relation between a filter volume on the inlet side and a thermal responsiveness of a filter composed of a honeycomb structured body having each of cross-sectional shapes shown in FIGS. 4A to 4D.
Figure 15:
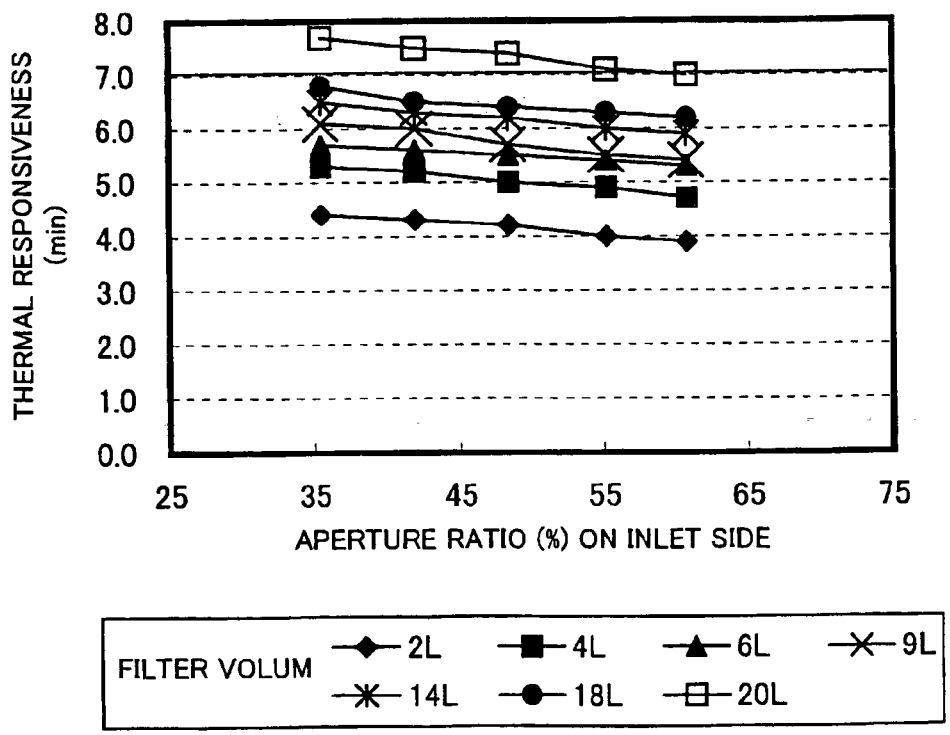
FIG. 15 is a graph indicating a relation between a filter volume on the inlet side and a thermal responsiveness of a filter composed of a honeycomb structured body having each of cross-sectional shapes shown in FIGS. 5A and 5B.
Figure 16:
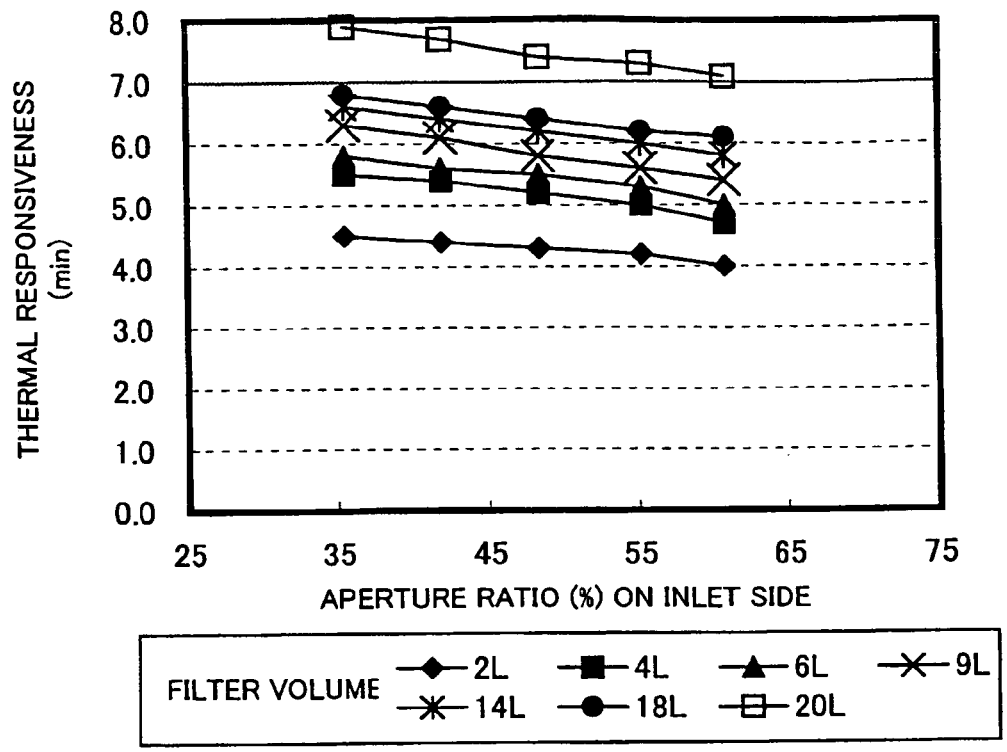
FIG. 16 is a graph indicating a relation between a filter volume on the inlet side and a thermal responsiveness of a filter composed of a honeycomb structured body having each of cross-sectional shapes shown in FIGS. 5E and 5F.
Figure 17:
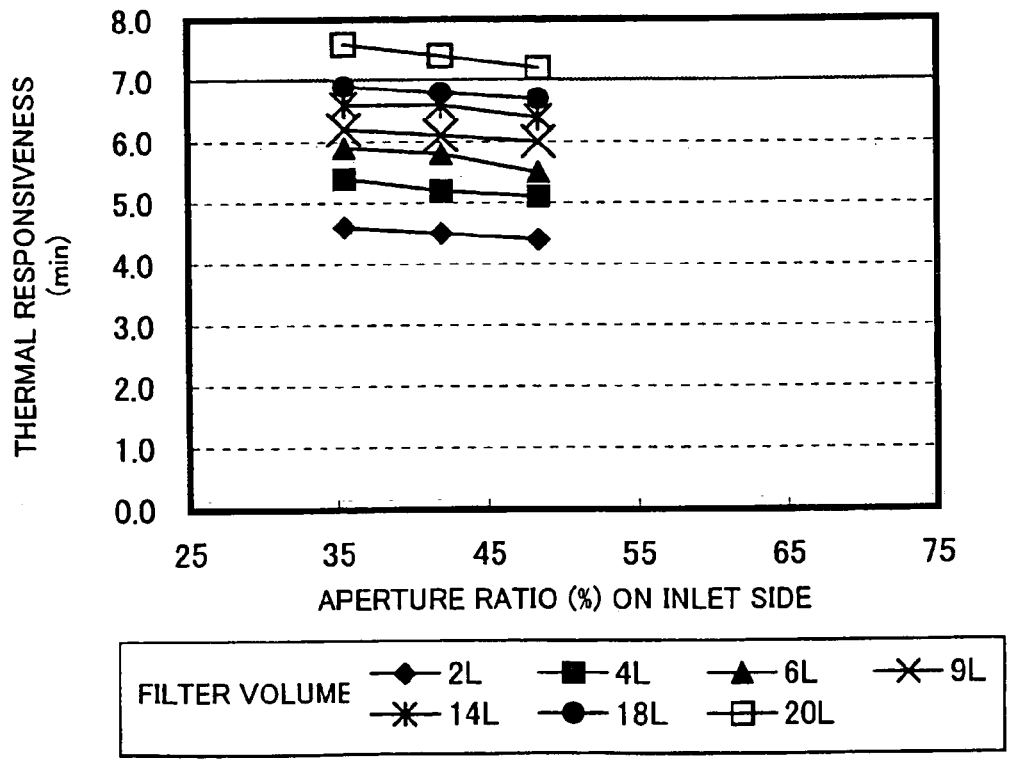
FIG. 17 is a graph indicating a relation between a filter volume on the inlet side and a thermal responsiveness of a filter composed of a honeycomb structured body having each of cross-sectional shapes shown in FIGS. 6A to 6D.
Figure 18:
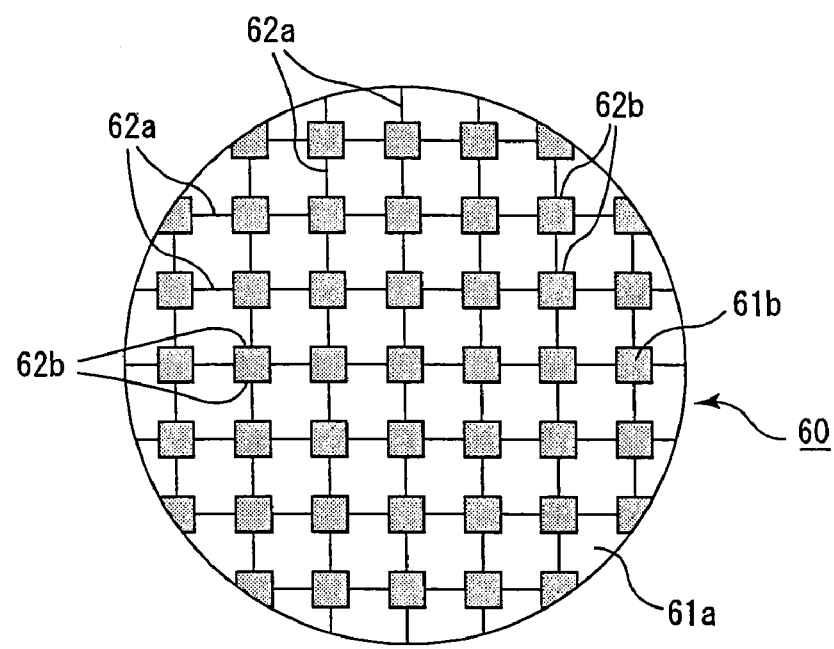
FIG. 18 is a vertical cross-sectional view showing schematically another example of a filter composed of a conventional honeycomb structured body.
Figure 19A:
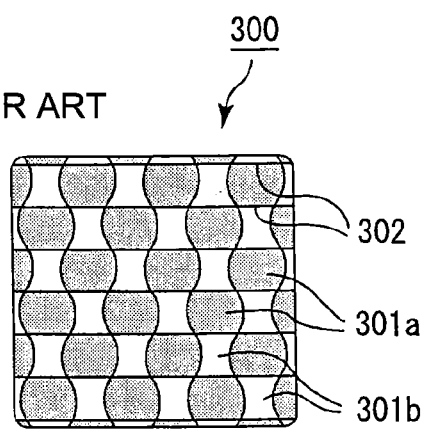
FIGS. 19A to 19D are vertical cross-sectional views each showing a further example of a filter composed of a conventional honeycomb structured body for purifying exhaust gases.
Figure 19B:
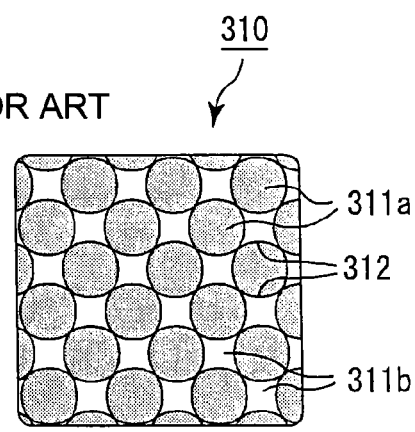
Figure 19C:
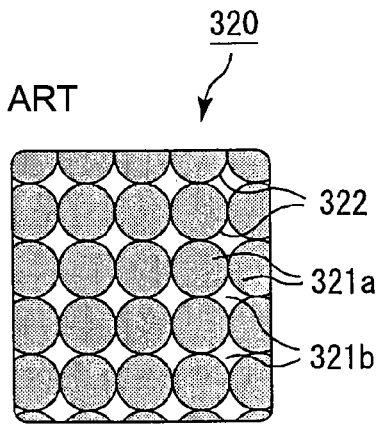
Figure 19D:
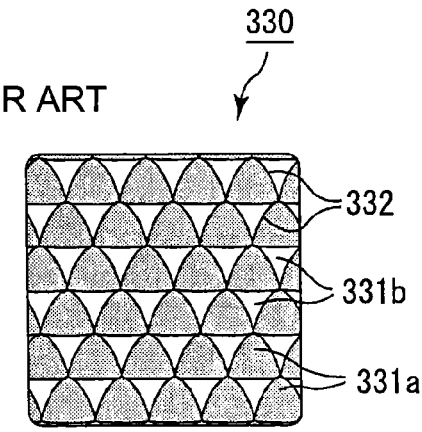
Figure 20:
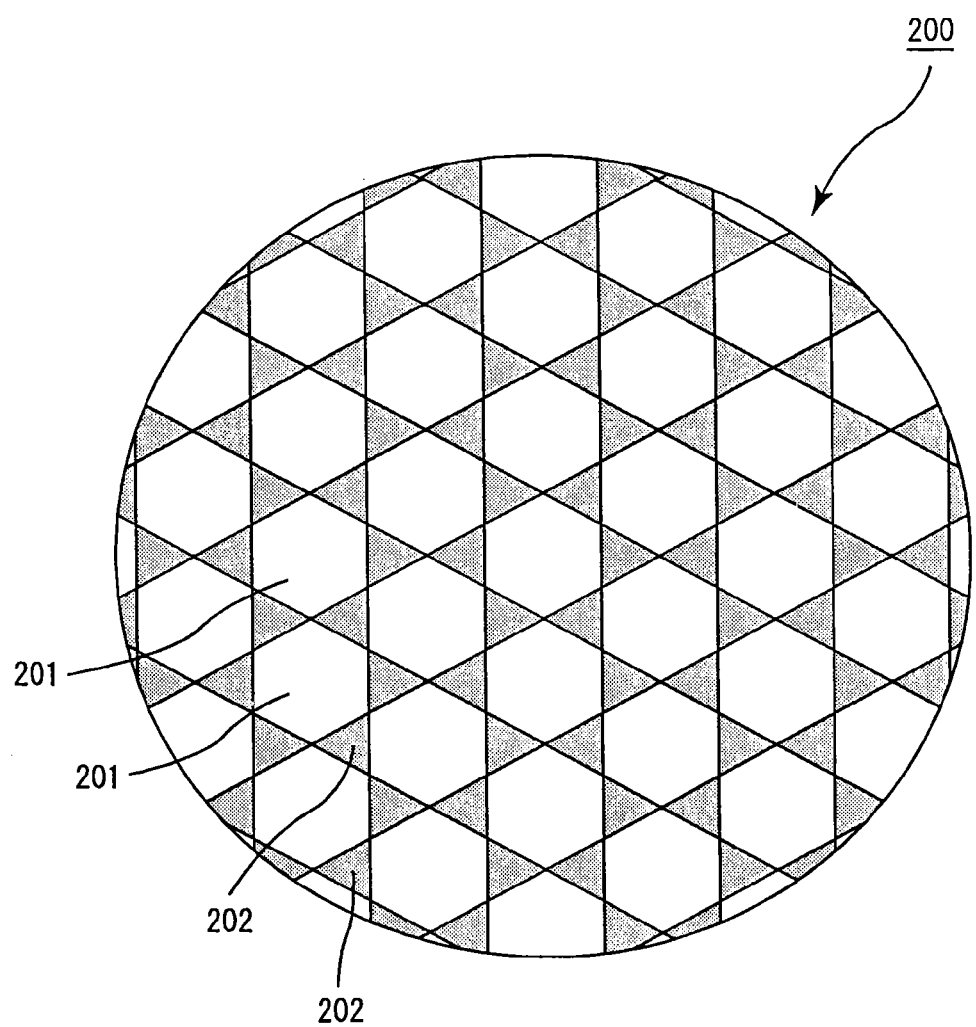
FIG. 20 is a cross-sectional view showing schematically a cross-section perpendicular to the length direction of a conventional porous ceramic member configured such that a ratio of the number of large-capacity through holes to that of small-capacity through holes is almost 1:2.
Figure 21:
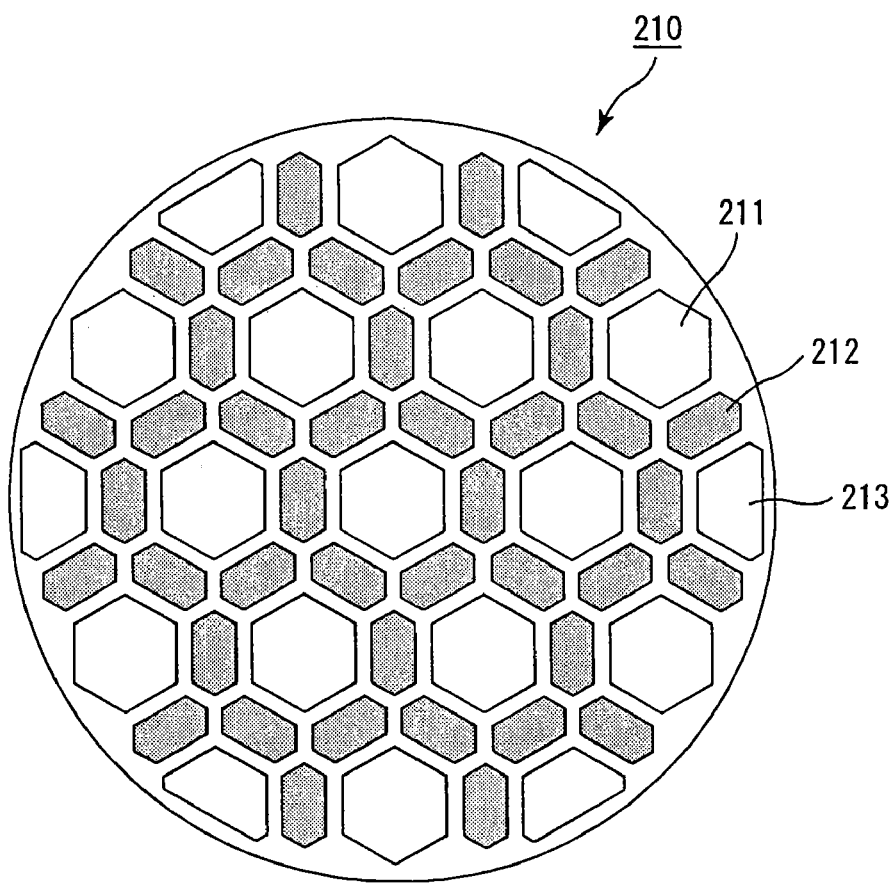
FIG. 21 is a cross-sectional view showing schematically across-section perpendicular to the length direction of a filter composed of a conventional honeycomb structured body.

Furthermore, a relation between an aperture ratio on-the inlet side of a filter and a thermal responsiveness was indicated with respect to each filter volume in a graph of FIG. 14 wherein filters have the cross-sectional shapes shown in FIGS. 4A to 4D, respectively; the relation was indicated also in a graph of FIG. 15 wherein filters have the cross-sectional shapes shown in FIGS. 5A and 5B, respectively; the relation was indicated also in a graph of FIG. 16 wherein filters have the cross-sectional shapes shown in FIGS. 5E and 5F, respectively; and the relation was indicated also in a graph of FIG. 17 wherein filters have the cross-sectional shapes shown in FIGS. 6A to 6D, respectively. As a result, it was apparent that the filters of the examples were excellent in thermal responsiveness.

(3) Compression Strength and Isostatic Strength of Filters

Each cube of around 30 mm was cut out from the filters shown in Tables, and a compression strength along A-axis was measured by Instron 5582.

Furthermore, an isostatic strength was measured with respect to each filter. In case of measurement, an aluminum plate (10 mm thickness) was placed on the upper and lower surface of a sample, respectively, and they were wrapped with a urethane rubber sheet (2 mm thickness) to seal them. The sample thus wrapped was placed in a pressure container filled up with water in a cold isostatic press (CIP), and pressed at 1.0 MPa/minute pressing rate, so that a pressure at which the sample was destroyed was determined as isostatic strength, and the results are shown in Tables 1 to 4.

TABLE 1

| | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
|---|---|---|---|---|---|---|---|
| Example 1 | FIGS. 4A–4D | 35.5 | 2 | 8.5 | 4.3 | 29 | 7.5 |
| Example 2 | FIGS. 4A–4D | | 4 | 8 | 5.1 | 29 | 7.4 |
| Example 3 | FIGS. 4A–4D | | 6 | 7.9 | 5.6 | 29 | 7.3 |
| Example 4 | FIGS. 4A–4D | | 9 | 7.8 | 5.9 | 29 | 7.1 |
| Example 5 | FIGS. 4A–4D | | 14 | 7.7 | 6.3 | 29 | 7.1 |
| Example 6 | FIGS. 4A–4D | | 18 | 7.5 | 6.6 | 29 | 7 |
| Example 7 | FIGS. 4A–4D | 41.9 | 2 | 9.5 | 4.2 | 28 | 9.4 |
| Example 8 | FIGS. 4A–4D | | 4 | 9 | 5 | 28 | 9.2 |
| Example 9 | FIGS. 4A–4D | | 6 | 8.5 | 5.5 | 28 | 9 |
| Example 10 | FIGS. 4A–4D | | 9 | 8.2 | 5.8 | 28 | 8.5 |
| Example 11 | FIGS. 4A–4D | | 14 | 8.1 | 6.2 | 28 | 8.4 |

TABLE 1-continued

|  | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
| --- | --- | --- | --- | --- | --- | --- | --- |
| Example 12 | FIGS. 4A–4D |  | 18 | 8 | 6.5 | 28 | 8.2 |
| Example 13 | FIGS. 4A–4D | 48.4 | 2 | 8.7 | 4 | 25 | 7.7 |
| Example 14 | FIGS. 4A–4D |  | 4 | 8.2 | 4.8 | 25 | 7.5 |
| Example 15 | FIGS. 4A–4D |  | 6 | 7.7 | 5.3 | 25 | 7.4 |
| Example 16 | FIGS. 4A–4D |  | 9 | 7.5 | 5.6 | 25 | 7.1 |
| Example 17 | FIGS. 4A–4D |  | 14 | 7.2 | 6 | 25 | 7 |
| Example 18 | FIGS. 4A–4D | 55.2 | 2 | 8 | 3.9 | 16 | 5.6 |
| Example 19 | FIGS. 4A–4D |  | 4 | 7.5 | 4.7 | 16 | 5.3 |
| Example 20 | FIGS. 4A–4D |  | 6 | 7 | 5.2 | 16 | 5.1 |
| Example 21 | FIGS. 4A–4D | 35.5 | 9 | 8.3 | 5.5 | 27 | 7.1 |
| Example 22 | FIGS. 4A–4D | 41.9 | 9 | 8.8 | 5.2 | 27 | 7.5 |
| Example 23 | FIGS. 4A–4D | 48.4 | 9 | 7.9 | 5.0 | 27 | 7.0 |
| Example 24 | FIGS. 4A–4D | 35.5 | 9 | 8 | 5.2 | 26 | 7.0 |
| Example 25 | FIGS. 4A–4D | 41.9 | 9 | 8.3 | 5.0 | 26 | 7.3 |
| Example 26 | FIGS. 4A–4D | 48.4 | 9 | 7.7 | 4.8 | 26 | 7.0 |

TABLE 2

|  | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
| --- | --- | --- | --- | --- | --- | --- | --- |
| Example 27 | FIGS. 5A, 5B | 41.9 | 2 | 8.6 | 4.3 | 26 | 9 |
| Example 28 | FIGS. 5A, 5B |  | 4 | 8.1 | 5.2 | 26 | 8.7 |
| Example 29 | FIGS. 5A, 5B |  | 6 | 8 | 5.8 | 26 | 8.5 |
| Example 30 | FIGS. 5A, 5B |  | 9 | 7.9 | 6 | 26 | 8.2 |
| Example 31 | FIGS. 5A, 5B |  | 14 | 7.6 | 6.3 | 26 | 8 |
| Example 32 | FIGS. 5A, 5B |  | 18 | 7.5 | 6.5 | 26 | 7.7 |
| Example 33 | FIGS. 5A, 5B | 48.4 | 2 | 8.5 | 4.2 | 24 | 7.6 |
| Example 34 | FIGS. 5A, 5B |  | 4 | 8 | 5 | 24 | 7.5 |
| Example 35 | FIGS. 5A, 5B |  | 6 | 7.8 | 5.5 | 24 | 7.4 |
| Example 36 | FIGS. 5A, 5B |  | 9 | 7.5 | 5.7 | 24 | 7.1 |
| Example 37 | FIGS. 5A, 5B |  | 14 | 7.1 | 6.2 | 24 | 7 |
| Example 38 | FIGS. 5A, 5B | 55.2 | 2 | 8 | 4 | 15 | 5.4 |
| Example 39 | FIGS. 5A, 5B |  | 4 | 7.5 | 4.9 | 15 | 5.2 |
| Example 40 | FIGS. 5A, 5B |  | 6 | 7 | 5.4 | 15 | 5 |
| Example 41 | FIGS. 5E, 5F | 41.9 | 2 | 8.6 | 4.4 | 27 | 8.8 |
| Example 42 | FIGS. 5E, 5F |  | 4 | 8.2 | 5.4 | 27 | 8.7 |
| Example 43 | FIGS. 5E, 5F |  | 6 | 8.1 | 5.6 | 27 | 8.5 |
| Example 44 | FIGS. 5E, 5F |  | 9 | 8 | 6.1 | 27 | 8.2 |
| Example 45 | FIGS. 5E, 5F |  | 14 | 7.9 | 6.4 | 27 | 7.9 |
| Example 46 | FIGS. 5E, 5F |  | 18 | 7.8 | 6.6 | 27 | 7.7 |
| Example 47 | FIGS. 6A–6D | 41.9 | 2 | 10.6 | 4.5 | 24 | 8.2 |
| Example 48 | FIGS. 6A–6D |  | 4 | 10.1 | 5.2 | 24 | 7.8 |
| Example 49 | FIGS. 6A–6D |  | 6 | 9.6 | 5.8 | 24 | 7.6 |
| Example 50 | FIGS. 6A–6D |  | 9 | 9.3 | 6.1 | 24 | 7.3 |
| Example 51 | FIGS. 6A–6D |  | 14 | 9.2 | 6.6 | 24 | 7.1 |
| Example 52 | FIGS. 6A–6D |  | 18 | 9.1 | 6.8 | 24 | 7.1 |

TABLE 3

|  | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
| --- | --- | --- | --- | --- | --- | --- | --- |
| Reference Example 1 | FIG. 6E | 28.6 | 2 | 12 | 4.6 | 17 | 13.3 |
| Reference Example 2 | FIG. 6E |  | 4 | 11.5 | 5.4 | 17 | 13.1 |
| Reference Example 3 | FIG. 6E |  | 6 | 11 | 5.9 | 17 | 12.9 |
| Reference Example 4 | FIG. 6E |  | 9 | 10.7 | 6.2 | 17 | 12.6 |
| Reference Example 5 | FIG. 6E |  | 14 | 10.6 | 6.6 | 17 | 12.5 |
| Reference Example 6 | FIG. 6E |  | 18 | 10.5 | 6.9 | 17 | 12.3 |
| Comparative Example 1 | FIGS. 4A–4D | 35.5 | 20 | 7.3 | 7.2 | 29 | 6.8 |
| Comparative Example 2 | FIGS. 4A–4D | 41.9 | 20 | 7.8 | 7.1 | 28 | 7.9 |
| Comparative Example 3 | FIGS. 4A–4D | 48.4 | 18 | 6.9 | 6.3 | 25 | 6.8 |

TABLE 3-continued

|  | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
|---|---|---|---|---|---|---|---|
| Comparative Example 4 | FIGS. 4A–4D |  | 20 | 6.7 | 6.7 | 25 | 6.7 |
| Comparative Example 5 | FIGS. 4A–4D | 55.2 | 9 | 6.7 | 5.5 | 16 | 4.7 |
| Comparative Example 6 | FIGS. 4A–4D |  | 14 | 6.6 | 5.9 | 16 | 4.6 |
| Comparative Example 7 | FIGS. 4A–4D |  | 18 | 6.5 | 6.2 | 16 | 4.4 |
| Comparative Example 8 | FIGS. 4A–4D |  | 20 | 6.3 | 6.5 | 16 | 4.2 |
| Comparative Example 9 | FIGS. 4A–4D | 60.8 | 2 | 6.9 | 3.8 | 15 | 5.2 |
| Comparative Example 10 | FIGS. 4A–4D |  | 4 | 6.7 | 4.6 | 15 | 5.1 |
| Comparative Example 11 | FIGS. 4A–4D |  | 6 | 6.4 | 5.1 | 15 | 4.8 |
| Comparative Example 12 | FIGS. 4A–4D |  | 9 | 6.3 | 5.4 | 15 | 4.5 |
| Comparative Example 13 | FIGS. 4A–4D |  | 14 | 6.2 | 5.8 | 15 | 4.4 |
| Comparative Example 14 | FIGS. 4A–4D |  | 18 | 5.8 | 6.1 | 15 | 4.1 |
| Comparative Example 15 | FIGS. 4A–4D |  | 20 | 5.6 | 6.4 | 15 | 4 |
| Comparative Example 16 | FIGS. 5E, 5F | 41.9 | 20 | 7.6 | 7 | 27 | 7.5 |
| Comparative Example 17 | FIGS. 6A–6D | 41.9 | 20 | 8.9 | 7.3 | 24 | 6.9 |

TABLE 4

|  | Cross-sectional shape | Aperture ratio on inlet side (%) | Filter volume (L) | Regeneration limit value (g/L) | Thermal responsiveness (min) | Compression strength along A-axis (MPa) | Isostatic strength (MPa) |
|---|---|---|---|---|---|---|---|
| Example 53 | FIGS. 4A–4D | 35.5 | 6 | 7.8 | 5.5 | 29 | 7.4 |
| Example 54 | FIGS. 4A–4D | 41.9 | 6 | 8.6 | 5.4 | 28 | 9.1 |
| Example 55 | FIGS. 4A–4D | 48.4 | 6 | 7.8 | 5.2 | 26 | 7.5 |
| Example 56 | FIGS. 4A–4D | 55.2 | 6 | 7.1 | 5.2 | 17 | 5.1 |
| Example 57 | FIGS. 4A–4D | 35.5 | 9 | 8.4 | 5.5 | 28 | 7.1 |
| Example 58 | FIGS. 4A–4D | 41.9 | 9 | 8.9 | 5.3 | 27 | 7.6 |
| Example 59 | FIGS. 4A–4D | 48.4 | 9 | 7.9 | 5.1 | 27 | 7.1 |
| Example 60 | FIGS. 4A–4D | 35.5 | 9 | 8.1 | 5.2 | 27 | 7.1 |
| Example 61 | FIGS. 4A–4D | 41.9 | 9 | 8.3 | 5.1 | 25 | 7.2 |
| Example 62 | FIGS. 4A–4D | 48.4 | 9 | 7.8 | 4.9 | 26 | 7.1 |
| Example 63 | FIGS. 5A, 5B | 41.9 | 6 | 7.9 | 5.9 | 27 | 8.4 |
| Example 64 | FIGS. 5A, 5B | 48.8 | 6 | 7.8 | 5.6 | 24 | 7.4 |
| Example 65 | FIGS. 5A, 5B | 55.2 | 6 | 7.1 | 5.4 | 16 | 5 |
| Example 66 | FIGS. 5E, 5F | 41.9 | 6 | 8.2 | 5.6 | 28 | 8.5 |
| Example 67 | FIGS. 6A–6D | 41.9 | 6 | 9.6 | 5.9 | 25 | 7.7 |

As is apparent from the results shown in Tables 1 to 4 and FIGS. 10 to 17, the filters of the examples exhibit more preferable values than those of the filters of the Comparative examples with respect to all of regeneration limit value, thermal responsiveness, and compression strength and isostatic strength of a filter.

According to the present invention, since a volume Y and an aperture ratio X on the inlet side of each filter comprising the above-mentioned honeycomb structural bodies have a relation represented by the above-mentioned inequality (1), a long life time can be achieved while maintaining a compact filter size (each size of the honeycomb structural bodies). Besides, such filter is excellent in mechanical strength and thermal responsiveness, a critical value of cracks is high, and it results in excellent durability.

What is claimed as new and desired to be secured by Letters Patent of the United States is:

1. A pillar-shaped honeycomb structural body comprising: a porous body having a plurality of through holes extending in parallel with one another in a length direction of the porous body and a wall portion interposed between said through holes, said plurality of through holes includes ones sealed at one end and ones sealed at the other end, wherein said plurality of through holes includes a plurality of large-capacity through holes opened on a flow-in side of said porous body and a plurality of small-capacity through holes opened on a flow-out side of said porous body, each of the large-capacity through holes has a relatively large area in a cross-section perpendicular to the length direction, each of the small-capacity through holes has a relatively small area in the cross-section, said large-capacity through holes and said small-capacity through holes have a substantially same number of through holes, said porous body satisfies relations, $Y \leq -1.1X+68.5$, $Y \leq 19$, and $35 \leq X \leq 56$, where Y represents a volume of said porous body in L and X represents an aperture ratio on the flow-in side in %.

2. The honeycomb structural body according to claim 1, wherein said porous body further satisfies relations, $Y \leq -1.1X+66.3$, $2.5 \leq Y \leq 19$, and $35 \leq X \leq 56$.

3. The honeycomb structural body according to claim 1, wherein said porous body is configured to purify exhaust gases of an internal combustion engine and satisfies $100V-400X \cdot Y \leq 100V+100$, where V represents a discharge amount of the internal combustion engine in L.

4. The honeycomb structural body according to claims 1, wherein said plurality of through holes has shapes in cross-sections perpendicular to the length direction which include at least two types of shapes.

5. The honeycomb structural body according to claim 1, wherein said plurality of through holes includes shapes in cross-sections perpendicular to the length direction which are a polygonal shape.

6. The honeycomb structural body according to claim 1, wherein said plurality of through holes includes shapes in cross-sections perpendicular to the length direction which are an octagonal shape and a quadrangular shape.

7. The honeycomb structural body according to claim 1, wherein a ratio of cross-sectional areas of the large-capacity through holes with respect to cross-sectional areas of the small-capacity through holes is at least about 1.55 and at most about 2.75.

8. The honeycomb structural body according to claim 7, wherein the ratio of cross-sectional areas of the large-capacity through holes with respect to cross-sectional areas of the small-capacity through holes is in the range of about 2.0 to about 2.54.

9. The honeycomb structural body according to claim 7, wherein the ratio of cross-sectional areas of the large-capacity through holes with respect to cross-sectional areas of the small-capacity through holes is in the range of about 2.0 to about 2.42.

10. The honeycomb structural body according to claim 1, wherein the large-capacity through holes, the small-capacity through holes or a combination thereof have curved peripheries of corners in cross-sections perpendicular to the length direction.

11. The honeycomb structural body according to claim 1, wherein a distance between centers of gravity in the cross-sections perpendicular to the length direction of the adjacently located large-capacity through holes is equal to a distance between centers of gravity in the cross-sections perpendicular to the length direction of the adjacently located small-capacity through holes.

12. The honeycomb structural body according to claim 1, further comprising a catalyst supported on a surface of said wall portion, an inside of the wall portion or a combination thereof.

13. The honeycomb structural body according to claim 1, wherein said porous body comprises a plurality of pillar-shaped porous members bound to one another through a sealing material layer.

14. The honeycomb structural body according to claim 13, wherein said porous members comprise ceramics and has a porosity of at least about 20% and at most about 80% by volume.

15. The honeycomb structural body according to claim 13, wherein said porous members comprise metal and has a porosity of at least about 50% and at most about 98% by volume.

16. The honeycomb structural body according to claim 13, wherein said porous members have an average pore diameter of at least about 1 μm and at most about 100 μm.

17. The honeycomb structural body according to claim 1, wherein said porous body comprises a pillar-shaped porous block.

18. The honeycomb structural body according to claim 17, wherein said porous block comprises ceramics and has a porosity of at least about 20% and at most about 80% by volume.

19. The honeycomb structural body according to claim 17, wherein said porous block comprises metal and has a porosity of at least about 50% and at most about 98% by volume.

20. The honeycomb structural body according to claim 17, wherein said porous block has an average pore diameter of at least about 1 μm and at most about 100 μm.

21. The honeycomb structural body according to claim 1, wherein said porous body has a cylindrical shape.

22. The honeycomb structural body according to claim 1, wherein said plurality of through holes has convex portions, concave portions or a combination thereof formed inside the through holes in parallel with the length direction.

23. The honeycomb structural body according to claim 22, wherein said convex portions, concave portions or combination thereof are configured to support selective catalysts, collect particulates, improve heat stress-resistance of said porous body or a combination thereof.

24. The honeycomb structural body according to claim 22, wherein the convex portions, concave portions or combination thereof are formed on a portion of the partition wall, the portion being shared in common by inlet side-through holes.

25. The honeycomb structural body according to claim 1, wherein said porous body has an isostatic strength is about 7 MPa or more.

26. The honeycomb structural body according to claim 25, wherein the isostatic strength is about 9 MPa or more.

27. The honeycomb structural body according to claim 1, wherein said porous body has a compression strength along an A-axis which is about 18 MPa or more.

28. The honeycomb structural body according to claim 27, wherein the compression strength along an A-axis is about 25 MPa or more.

29. The honeycomb structural body according to claim 1, wherein said porous body has a shape in a cross-section perpendicular to the length direction which is a single shape and has at least two types of cross-sectional areas.

30. The honeycomb structural body according to claim 1, wherein said porous body has a main component which is at least one material selected from the group consisting of SiC, $Si_3N_4$, aluminum titanate, cordierite, mullite, alumina, spinel, lithium aluminum silicate, Fe.Cr.Al-base metals, and metallic silicon.

31. An exhaust gas purifying device for a vehicle comprising the honeycomb structural body according to claim 1.

32. An exhaust gas purifying device, comprising the honeycomb structural body according to claim 1.

33. The honeycomb structural body according to claim 1, wherein said porous body comprises one of a porous block, a plurality of porous members, and a plurality of porous laminating members.

* * * * *